US012345558B2

(12) United States Patent
Dyer

(10) Patent No.: US 12,345,558 B2
(45) Date of Patent: *Jul. 1, 2025

(54) PRODUCT RESERVOIR INCLUDING INTELLIGENT LEVEL SENSOR

(71) Applicant: Delaware Capital Formation, Inc., Wilmington, DE (US)

(72) Inventor: Christopher James Dyer, Hook (GB)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,184

(22) Filed: Jun. 3, 2024

(65) Prior Publication Data

US 2024/0318996 A1 Sep. 26, 2024

Related U.S. Application Data

(63) Continuation of application No. 17/433,760, filed as application No. PCT/US2020/025290 on Mar. 27, 2020, now Pat. No. 12,038,315.

(Continued)

(51) Int. Cl.
*G01F 23/28* (2006.01)
*B67D 3/00* (2006.01)
(Continued)

(52) U.S. Cl.
CPC ......... *G01F 23/282* (2013.01); *B67D 3/0093* (2013.01); *G01F 23/2928* (2013.01); *G01F 23/2962* (2013.01)

(58) Field of Classification Search
CPC .............. G01F 23/282; G01F 23/2928; G01F 23/2962; G01F 13/00; G01F 23/284; B67D 3/0093

See application file for complete search history.

(56) References Cited

U.S. PATENT DOCUMENTS 5,085,077 A * 2/1992 Stapleton ............ G01F 23/2962
367/908
6,539,794 B1 4/2003 Otto et al.
(Continued)

FOREIGN PATENT DOCUMENTS

JP H09276199 A 10/1997

OTHER PUBLICATIONS

International Preliminary Report on Patentability in International Appln. No. PCT/US2020/025290, mailed on Oct. 14, 2021.
(Continued)

*Primary Examiner* — David Z Huang
(74) *Attorney, Agent, or Firm* — Fish & Richardson P.C.

(57) ABSTRACT

Systems, methods, and computer program products for monitoring a level of product in a reservoir of a chemical dispensing system. A lid configured to engage an opening of a container includes a level sensor having a transceiver that transmits an output signal and receives a portion of the output signal reflected back to the transceiver. The level sensor determines an amount of the product in the container by comparing a characteristic of the reflected signal, such as time the reflected signal was received, to the characteristic of the output signal, such as the time the output signal was transmitted. The level sensor may also determine the size of the container based on the reflected signal, and take this size into account when determining the amount of product in the container. The level sensor transmits product level data to a mobile device in response to receiving an interrogation signal therefrom.

20 Claims, 23 Drawing Sheets

Related U.S. Application Data

(60) Provisional application No. 62/827,449, filed on Apr. 1, 2019.

(51) Int. Cl.
*G01F 23/292* (2006.01)
*G01F 23/2962* (2022.01)

(56) References Cited

U.S. PATENT DOCUMENTS

| | | |
|---|---|---|
| 12,038,315 B2 * | 7/2024 | Dyer .................. G01F 23/2928 |
| 2005/0088309 A1 | 4/2005 | Meeks et al. |
| 2006/0032862 A1 | 2/2006 | Miller |
| 2008/0107151 A1 | 5/2008 | Khadkikar et al. |
| 2010/0058856 A1 * | 3/2010 | Yinko ................. G01F 23/2962 |
| | | 73/426 |
| 2013/0076559 A1 | 3/2013 | Edvardsson |
| 2014/0014684 A1 | 1/2014 | Classen et al. |
| 2015/0337708 A1 | 11/2015 | Schlenke et al. |
| 2016/0025545 A1 | 1/2016 | Saltzgiver et al. |
| 2016/0146659 A1 | 5/2016 | Saltzgiver et al. |
| 2016/0252466 A1 | 9/2016 | Croft et al. |
| 2018/0328776 A1 * | 11/2018 | Gurumohan ......... B67D 3/0093 |
| 2019/0170560 A1 * | 6/2019 | Rohr .................. G01F 23/2962 |

OTHER PUBLICATIONS

International Search Report and Written Opinion in International Appln. No. PCT/US2020/025290, mailed on Jun. 29, 2020.

* cited by examiner

PRODUCT RESERVOIR INCLUDING INTELLIGENT LEVEL SENSOR

CROSS-REFERENCE TO RELATED APPLICATIONS

This application is a continuation of U.S. patent application Ser. No. 17/433,760, filed on Aug. 25, 2021, which is a National Stage Application under 35 USC § 371 and claims the benefit of International Patent Application No. PCT/US2020/025290, filed on Mar. 27, 2020, which claims the benefit of U.S. Provisional Patent Application No. 62/827,449, filed on Apr. 1, 2019, which are incorporated herein by reference in their entirety.

BACKGROUND

This invention generally relates to chemical dispensing systems for laundry, ware-wash, and healthcare applications, and in particular, to systems, methods, and computer program products for monitoring a level of chemical product in a reservoir of a chemical dispensing system.

The dispensing of liquid chemical products from one or more chemical receptacles is a common requirement of many industries. For example, in an industrial laundry facility, each of several washing machines must be provided with aqueous solutions containing various quantities of alkaloid, detergent, bleach, starch, softener, or other chemical products.

The chemical products being dispensed are typically stored in containers with probe assemblies that monitor the level of products in the containers. Probe assemblies may detect the level of products in the containers using mechanical floats or electrical probes, for example. One type of probe assembly includes two probes separated by a distance so that the probe assembly has a high input impedance when exposed to air. Because the products are typically conductive, the input impedance of this type of probe assembly is lower when the probes are in contact with the product. To provide an indication of the level of product in a container, the probe assembly is mounted in the container so that the probes are in contact with the product, or the float causes a switch to be in a particular state (e.g., open or closed) when the container is sufficiently full. When the level of product drops below the probes, the electrical probes are exposed to air, increasing the input impedance of the probe assembly, or the float drops sufficiently to change the state of the switch. To notify the operator of the chemical dispensing system that the container is running low on product, a monitoring device is connected to the probe assembly. In this type of detection system, the monitoring device is configured to detect the increase in the input impedance of the probe assembly or the change in the state of the switch, and may thereby notify an operator that the product is about to run out by providing an alarm.

One weakness in these types of level monitoring systems is that they typically do not provide information regarding the level of product until the product is about to run out. Moreover, the buildup of deposits on conductive probes and float mechanisms can impair the ability of the system to detect when the product has dropped low enough to indicate a low product condition. Probe and float assemblies may also experience reliability issues over time from the product attacking the probes and assemblies due to the corrosive nature of many of the chemicals typically found in the product. This can lead to erroneous readings and result in false alarms or failures to notify the operator that a product is running out.

Therefore, there is a need for improved systems, methods, and software products for monitoring the level of chemical products in containers used with chemical dispensing systems.

SUMMARY

In an embodiment of the invention, a reservoir for a chemical dispensing system is provided. The reservoir includes a lid configured to engage an opening of a container, and a transceiver coupled to the lid and configured to transmit an output signal and receive a portion of the output signal reflected back to the transceiver as a reflected signal. A computing device operably coupled to the transceiver is configured to determine an amount of a product in the container by comparing a characteristic of the reflected signal to the characteristic of the output signal.

In an aspect of the invention, the computing device compares the characteristic of the reflected signal to the characteristic of the output signal by determining an amount of time between a transmission time of the output signal and an arrival time of the reflected signal, and determines the amount of the product in the container based on the amount of time.

In another aspect of the invention, the computing device determines a distance between a surface of the product and the transceiver based on the amount of time, and determines the amount of the product in the container based on the distance.

In another aspect of the invention, the computing device is configured to determine a size of the container based on the characteristic of the reflected signal.

In another aspect of the invention, the characteristic of the reflected signal is compared to one or more of the characteristic of the output signal or the characteristic of the reflected signal associated with one or more containers in a library of containers.

In another aspect of the invention, the reservoir further includes a cover and a linkage that operatively couples the cover to the lid so that when the cover is closed, the lid engages the opening of the container, and when the cover is opened, the lid disengages from the opening of the container.

In another aspect of the invention, the reservoir further comprises a sensor operatively coupled to the computing device and configured to detect if the cover is in an open state or a closed state, and the computing device causes the transceiver to transmit the output signal in response to detecting the cover has changed from the open state to the closed state.

In another aspect of the invention, the computing device is further configured to transmit data indicative of the amount of the product in the container to a database.

In another aspect of the invention, the computing device transmits the data indicative of the amount of the product in response to receiving an interrogation signal from a mobile device.

In another aspect of the invention, the database is a network database, and the data is transmitted to the database through the mobile device.

In another aspect of the invention, the computing device is configured to issue an alarm in response to identifying a change in a level of the product that exceeds a threshold.

In another embodiment of the invention, a method of monitoring the level of the product in the reservoir for the chemical dispensing system is provided. The method includes engaging the opening of the container with the lid, transmitting the output signal from the transceiver in the lid, receiving the portion of the output signal reflected back to the transceiver as the reflected signal, and determining the amount of the product in the container by comparing the characteristic of the reflected signal to the characteristic of the output signal.

In an aspect of the invention, comparing the characteristic of the reflected signal to the characteristic of the output signal includes determining the amount of time between the transmission time of the output signal and the arrival time of the reflected signal, and determining the amount of the product in the container based on the amount of time.

In another aspect of the invention, determining the amount of the product in the container based on the amount of time includes determining the distance between the surface of the product and the transceiver based on the amount of time, and determining the amount of the product in the container based on the distance.

In another aspect of the invention, the size of the container is determined based on the characteristic of the reflected signal.

In another aspect of the invention, determining the size of the container based on the characteristic of the reflected signal includes comparing the characteristic of the reflected signal to at least one of the characteristic of the output signal and the characteristic of the reflected signal associated with one or more containers in a library of containers.

In another aspect of the invention, the method further comprises detecting if the cover of the reservoir is in the open state or the closed state, the cover is coupled to the lid by the linkage so that when the cover is closed, the lid engages the opening of the container, when the cover is opened, the lid disengages from the opening of the container, and the transceiver transmits the output signal in response to detecting the cover has changed from the open state to the closed state.

In another aspect of the invention, the computing device is further configured to transmit data indicative of the amount of the product in the container to the database.

In another aspect of the invention, the data indicative of the amount of the product is transmitted to the database in response to receiving the interrogation signal from the mobile device.

In another aspect of the invention, the database is the network database, and the data is transmitted to the database through the mobile device.

In another embodiment of the invention, a connector assembly for coupling to a neck disposed about an opening of a container is provided. The connector assembly includes a collar configured to engage the neck and a lid that is held in place over the opening of the container by the collar. The transceiver is coupled to the lid and configured to transmit the output signal into the container and receive the portion of the output signal reflected back to the transceiver as the reflected signal, and the computing device is operably coupled to the transceiver and configured to determine the amount of a product in the container by comparing the characteristic of the reflected signal to the characteristic of the output signal.

In an aspect of the invention, the collar includes an upper surface that faces away from the container, and the connector assembly further includes a multi-pin connector operatively coupled to the upper surface of the collar.

In another aspect of the invention, the computing device is external to the connector assembly, and the multi-pin connector is configured to operatively couple the transceiver to the computing device when the container is installed in the reservoir.

In another aspect of the invention, the connector assembly further includes a support ring that mechanically couples the transceiver to the lid and that includes a plurality of conductive elements that electrically couple the transceiver to the multi-pin connector.

In another aspect of the invention, the connector assembly further includes a fluidic coupler configured to couple a supply line external to the container to a pickup tube internal to the container.

In another aspect of the invention, the lid includes an opening configured to receive a supply line or a pickup tube.

In another aspect of the invention, the connector assembly further includes a sensor assembly including an elongated body having a lower portion that projects downward from the lid, and the transceiver is mounted to the lower portion.

In another embodiment of the invention, an apparatus for detecting a level of product in the container is provided. The apparatus includes an elongated body including a cavity and a distal end having a cutting edge, the cutting edge being configured to cut a hole that provides access to an interior of the container. The transceiver is located in the cavity and configured to transmit the output signal into the container and receive the portion of the output signal reflected back to the transceiver as the reflected signal, and the computing device is operably coupled to the transceiver and configured to determine the amount of the product in the container by comparing the characteristic of the reflected signal to the characteristic of the output signal.

In an aspect of the invention, the cutting edge is configured to cut the hole in the lid of the container, and the cavity is located at the distal end of the elongated body.

In another aspect of the invention, the elongated body includes a sidewall having an opening, the cutting edge is configured to cut the hole in a wall of the container, and the cavity is located adjacent to the opening.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention are directed to improved systems, methods, and computer program products for determining consumption of products, such as concentrated chemical solutions. Product consumption may refer to an amount of a product used between service visits at a site including one or more chemical dispensers.

Figure 1:
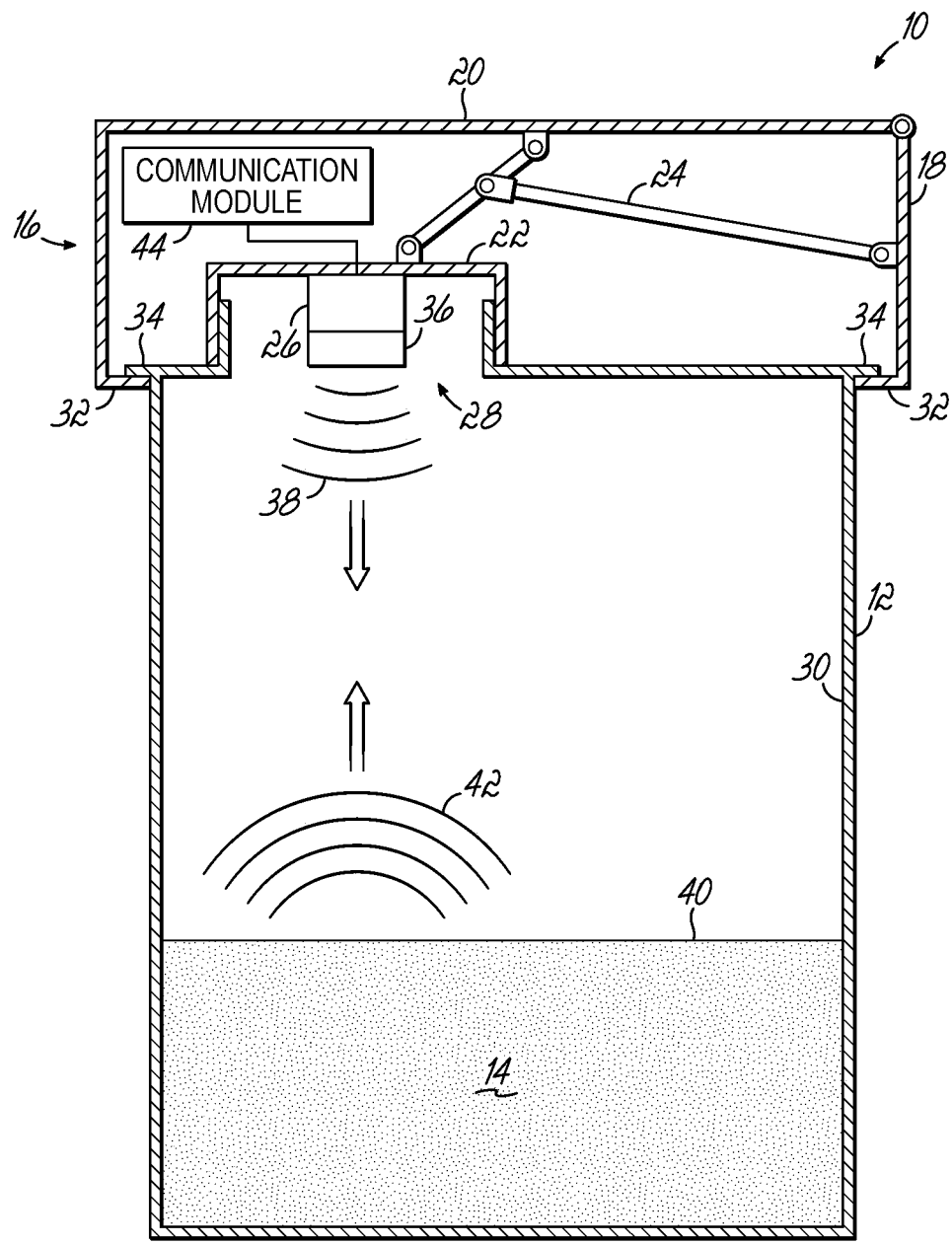
FIG. 1 is a diagrammatic view of a reservoir including a container that holds a product and a level sensor that measures a level of the product.

FIG. 1 depicts a reservoir 10 including a container 12 configured to hold a product 14 such as a concentrated chemical solution that is used by a dispensing system, and a housing 16 configured to be coupled to the container 12. The housing 16 may include a frame 18 and a cover 20 hingedly coupled to the frame 18. A lid 22 may be coupled to one or more of the frame 18 and cover 20 by a linkage 24 and include a level sensor 26. The linkage 24 may be configured so that as the cover 20 is opened (e.g., by pivoting the cover 20 upward), the lid 22 and level sensor 26 move out of engagement with an opening 28 of container 12. This may facilitate adding additional product 14 to the reservoir 10, either as bulk product 14 added to the existing container 12 or as a replacement container 12 filled with product 14. The linkage 24 may be further configured so that when the cover 20 is closed, the lid 22 engages the opening 28 of container 12 and the level sensor 26 is re-positioned in essentially the same location as before the cover 20 was opened. The linkage 24 may thereby maintain the lid 22 and level sensor 26 in a consistent position or orientation with respect to an interior surface 30 of container 12 when the container 12 or product 14 is replaced. The frame 18 of housing 16 may include a lip 32 configured to engage a shoulder 34 of container 12, thereby holding the container 12 in position under the housing 16. This may enable, for example, an old container 12 to be slid out from under the housing 16, and a new container 12 to be slid into position under the housing 16.

The level sensor 26 may include a transceiver 36 configured to transmit an output signal 38 and a computing device operatively coupled to the transceiver. The output signal 38 may be a pulse of electromagnetic or acoustic energy such as an infrared laser, microwave, or ultrasonic sound, and may be transmitted periodically or in response to an event, such as opening or closing the cover 20. The opening or closing of the cover 20 may be detected, for example, using a magnetic proximity sensor (e.g., a Hall effect sensor or reed switch) mounted to the frame 18 and a magnet mounted to the cover 20 that activates the sensor/switch, or by any other suitable sensor that detects when the cover is in at least one of an open state and a closed state.

A portion of the output signal 38 may be reflected back toward the level sensor 26 by one or more of the interior surface 30 of container 12 or a surface 40 of product 14 as a reflected signal 42. The reflected signal 42 may be received by the transceiver 36, and distances to one or more of the interior surface 30 or the surface 40 of product 14 determined based thereon. To this end, the level sensor 26 may be configured to determine a characteristic of the reflected signal 42, such as an arrival time or phase of the reflected signal 42. This characteristic may be compared to a corresponding characteristic of the output signal 38, such as a transmission time or phase of the output signal 38.

The level sensor 26 or a computing device in communication with the level sensor 26 (e.g., a controller of the chemical dispenser) may determine a level of the surface 40 based on a value of the characteristic of the reflected signal 42 relative to a value of the characteristic of the output signal 38. For example, the amount of time it takes for the output signal 38 to reach the surface 40 of product 14 and be reflected back to the level sensor 26, or the "time of flight" of the output signal 38, may be determined by comparing the time of arrival of the reflected signal 42 to the time of transmission of the output signal 38.

In an embodiment of the invention, a communication module 44 may be operatively coupled to the level sensor 26. The communication module 44 may be a computing device that includes communication circuitry, such as a wireless transceiver configured to transmit and receive data. The communication module 44 may offload data processing functions from the level sensor 26, such as control of when the level sensor 26 takes readings, processing and storage data received from the level sensor 26, as well as transmission and reception of data from other devices. The communication module 44 may be external to the level sensor 26 as shown, or integrated into the level sensor 26.

The distance determined using the level sensor 26 may be accurate to within 1 to 2 mm, for example, and may be used to determine a volume of product 14 in the container 12, e.g., based on a known shape of the container 12 and depth of the product 14. The shape of the container may be known because the container 12 has a consistent shape over time, by reading a tag on the container (not shown) that provides information about the container 12 to the level sensor 26 or the computing device, or based on the characteristics of the reflected signal 42. For example, the characteristics of the reflected signal 42 may provide an indication of the shape or dimensions of the interior surface 30 of container 12, such as the length and width of the container 12. Tags may include a Radio Frequency Identification (RFID) tag, a Near-Field Communication (NFC) tag, a barcode, or the like, and may be read by a tag reader (not shown) located in the housing 16 of reservoir 10.

The reservoir 10 may be configured to handle containers 12 with varying horizontal cross-sectional areas. For example, a volume computing algorithm may account for varying cross-sectional areas of the container 12 at different distances from the level sensor 26. This algorithm may be used to determine volume of product 14 remaining in the container 12 based on the dimensional data of the container 12 and the measured distance to the surface 40 of product 14. The appropriate algorithm to use with the installed container 12 may be selected based on an identity of the container 12. By way of example, a 20-liter container may have three specific sections each having a known cross-sectional area at different distances from the level sensor 26. In an embodiment of the invention, the algorithm may comprise a lookup table that provides a volume of product 14 in the container 12 based on the distance measured to the surface 40 of product 14.

To enable the reservoir 10 to deal with a plurality of different container types, a library of containers 12 that are used in the reservoir 10 may be stored in a memory accessed by the level sensor 26. The correct algorithm may then be selected from a list by a service technician, by the level sensor 26 based on data retrieved from a tag on the container 12, or by the level sensor 26 based on the characteristics of the reflected signal 42. For example, the level sensor may compare the characteristics of the reflected signal 42 to the characteristics of reflected signals which would be expected from each container 12 in the library of containers 12, and select the container 12 having the closest match.

Figure 2:
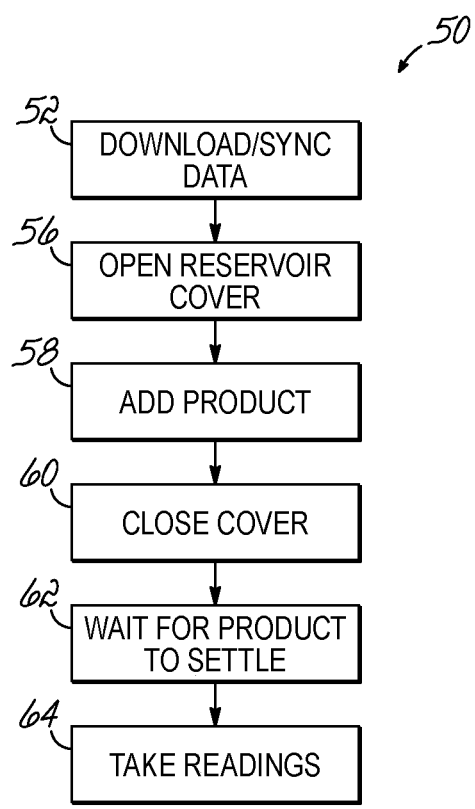
FIG. 2 is a flow chart of a process for determining a baseline level of the product using the level sensor of FIG. 1.

FIG. 2 depicts a flowchart illustrating a process 50 that may be executed when product 14 is added to the container 12. In block 52, the process 50 may synchronize data from the reservoir indicative of one or more amounts of product 14 measured by the level sensor 26, e.g., the most recent measurement. This data synchronization may include downloading of the data by a mobile device 54 (FIG. 3) and storage of the data in a database. Before the data is downloaded, the level sensor 26 may take a reading of the level and store the reading so that the downloaded data includes the current level. This "final" reading may be triggered in response to receiving an interrogation signal from the mobile device 54, for example. The mobile device 54 may thereby record the current level of product 14, or "product level" before replenishment.

In block 56, the cover 20 of reservoir 10 may be opened. The opening of cover 20 may be detected by the level sensor 26 (e.g., using an integrated inclination sensor or accelerometer), or by another device (not shown) configured to monitor the state of the cover 20 (e.g., the above described magnetically activated sensor/switch or other sensor). In response to detecting that the cover 20 has been opened, the process 50 may disable the level sensor 26. Disabling the level sensor 26 may ensure that the output signal 38 is not unintentionally directed toward the service technician, for example.

In response to the cover 20 being opened, the process 50 may proceed to block 58. In block 58, product 14 may be added to the reservoir 10, e.g., by topping off the product 14 or replacing the depleted container 12 with a new container 12. In block 60, the cover 20 may be returned to its home, latched, or closed position. In response to the cover 20 being closed, the process 50 may proceed to block 62 and wait for an amount of time that allows the product 14 to settle. The process 50 may then proceed to block 64 and take one or more readings, e.g., by emitting the output signal 38. This reading may be used to determine the amount of product 14 in the container 12, and the amount of product stored in the database as a baseline value for determining usage on the next service visit.

In operation, product level readings may be taken at predetermined intervals (e.g., once a minute, once an hour, once a day, etc.), or in response to an event, such as detection of the cover 20 being closed, the occurrence of a dispensing operation, or reception of a synchronization signal from the mobile device 54. Each time a reading is taken, the level sensor 26 or other computing device may determine the amount of product 14 in the reservoir 10.

Figure 3:
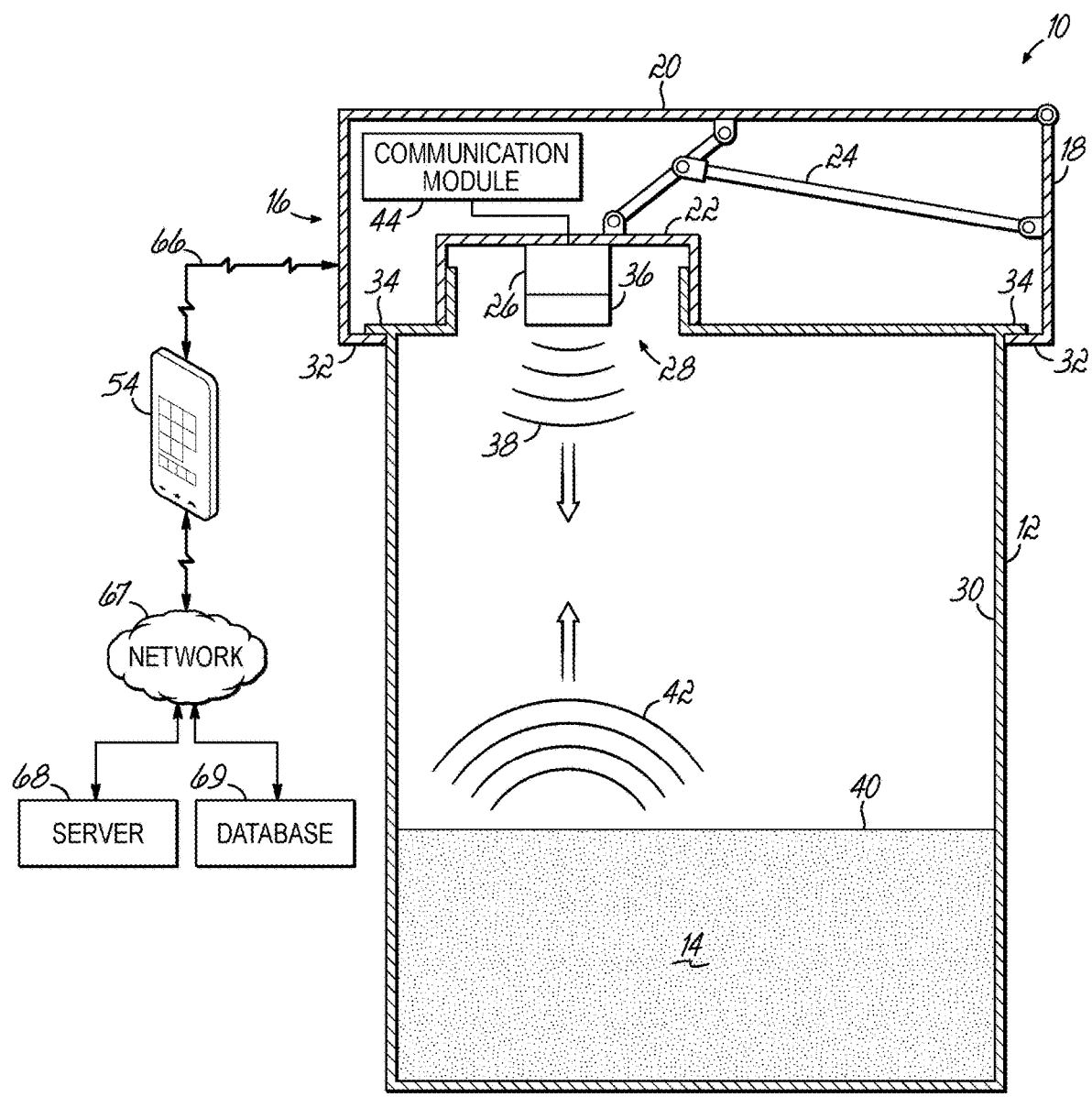
FIG. 3 is a diagrammatic view of the reservoir of FIG. 1 depicting a mobile device interrogating the level sensor for data indicative of the product level.

Referring now to FIG. 3, in an embodiment of the invention, the level sensor 26 may include a memory in which the amounts or levels of the product 14 determined by the level sensor 26 are stored. In response to receiving an interrogation signal 66 from the mobile device 54, the level sensor 26 may transmit at least a portion of the data stored in the memory. Exemplary mobile devices 54 may include smart phones, tablet computers, or any other portable computing device, and may communicate with the level sensor 26 using any suitable communication protocol. Exemplary communication protocols may include, but are not limited to, Bluetooth®, Radio Frequency Identification (RFID), and Near-Field Communication (NFC). The mobile device 54 may also communicate with a network 67 using a communication protocol such as Wi-Fi®, Bluetooth®, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), and Integrated Digital Enhanced Network (iDEN), or any other suitable protocol. The network 67 may enable communication with a server 68 and a database 69.

Based on the data received from the level sensor 26, the mobile device 54 or another computing device may determine product usage between service visits and whether the reservoir 10 is low or out of product 14. The mobile device 54 or other computing device may also determine if there is an unexpected deficit or surplus of product, e.g., product 14 missing from the container 12 that did not flow through the chemical dispenser. A product level discrepancy may be determined using an algorithm that compares an expected consumption of product 14 by operation of the dispenser (e.g., based on the number and duration of dispensing operations) against a measured change in the volume of product 14 in the container 12. Reasons for product level discrepancies may include theft or leakage of product 14 (which may produce a product deficit) or a blocked dispensing tip in the dispenser (which may produce a product surplus). In any case, if the reservoir 10 is low or out of product 14, the mobile device 54 may prompt the service technician to replenish the product 14 based on the data downloaded from the level sensor 26.

Product level data may also be used to determine usage, and the usage data further analyzed to determine a time when the product 14 is expected to run out. Knowing how much product is in the container 12 may allow calculation of a time in the future when the container 12 is likely to run out. This ability to predict when the product 14 will run out may enable the customer to store less product 14 on site by scheduling delivery of one or more containers of product 14 before the container 12 is depleted.

Figure 4:
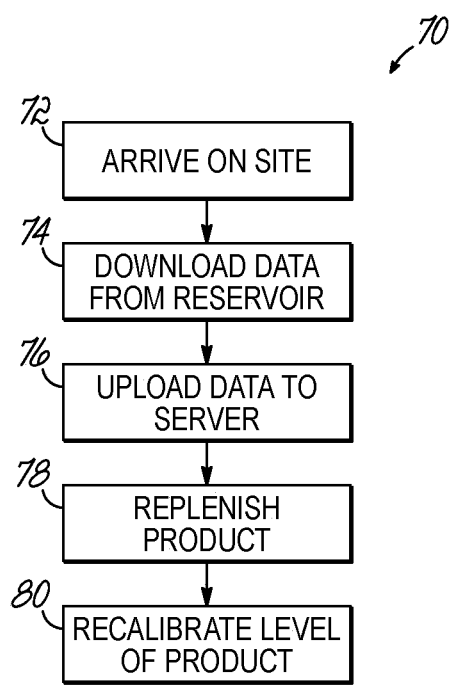
FIG. 4 is a flow chart of a process for obtaining data from the level sensor using the mobile device of FIG. 3.

FIG. 4 depicts a flowchart illustrating a process 70 that may be executed when the service technician visits a site where the reservoir 10 has been installed. In block 72, the service technician may arrive on site. The process 70 may determine that the technician is on site based on a location of the mobile device 54 (e.g., using a global positioning system (GPS) or other network navigation system), a signal received by the mobile device 54 (e.g., a wireless network signal including an identifier associated with the site, such as a WiFi signal), or in response to input from the service technician. For example, during a synchronizing event, the mobile device 54 may read a unique identifier (UID) from one or more reservoirs 10 on site. The UID of each reservoir 10 may have been previously associated with a particular location, thereby enabling the mobile device 54 to identify its location at sites where GPS or other radio-navigation signals are not unavailable.

In response to the mobile device 54 arriving on site, the process 70 may proceed to block 74 and download data from the reservoir. This data download may be initiated by causing the mobile device 54 to transmit the interrogation signal 66. By way of example, the interrogation signal 66 may be transmitted by the mobile device 54 in response to the mobile device 54 determining it is proximate to the reservoir 10. The interrogation signal 66 may also be transmitted in response to the service technician providing an input to an application running on the mobile device 54 that prompts the mobile device 54 to transmit the interrogation signal 66.

Once the data has been downloaded from the level sensor 26, the process 70 may proceed to block 76 and upload the data to the server 68. The server 68 may comprise a computer system or cloud-based service that includes at least one running instance of an application which provides functionality for other applications or "clients". Client applications may be hosted, for example, by one or more of the level sensor 26 or mobile device 54. Exemplary services that may be provided by the server 68 include an application server, a file server, a web server, a database server, or any other suitable server. Operational data collected from the level sensor 26 by the mobile device 54 may be uploaded to the server 68 and stored in the database 69 where it can be accessed by other computing devices, e.g., using a web-browser or other client application. This data upload can happen at any time, e.g., immediately upon receipt of operational data by the mobile device 54, or at a later time when communication between the mobile device 54 and the server 68 is possible, such as after exiting from a basement location.

In cases where a customer being serviced by the reservoir 10 has signed up for auto-billing, once the data has been uploaded to the server 68, the server 68 may determine product usage and generate a bill for the customer. The bill may then be sent to the customer or automatically deducted from an account maintained by the customer.

In block 78, the process 70 may determine that the level of the product 14 in reservoir 10 is low, and prompt the service technician to refill or replace the container 12. This prompting may be provided by the mobile device 54 emitting sounds or displaying information on a screen indicating to the service technician that the product 14 is running low. The information may include, for example, an amount or type of product 14 to be added. In response to the cover 20 being closed and latched, the process 70 may proceed to block 80 and reset the baseline level of the product 14 in order to determine usage of the product 14 based on changes in product level at the next service visit.

Embodiments of the invention may be configured to identify when an unexpected product level is detected. To this end, the level sensor 26, mobile device 54, server 68, database 69, or other suitable computing device may learn over time how the number and duration of dispense cycles affects the product level. Depending on the amount of product 14 drawn by each dispense cycle, the amount drawn per cycle may be calculated over multiple dispense cycles or periods of time, e.g., several days. In a typical application, the product level would normally decrease at a relatively consistent and predicable rate. This rate could be determined based on historical daily usage data, and could vary on a temporal basis, e.g., by the day of the week with lower use on weekends and holidays. Based on this historical data, an expected product level may be determined for the reservoir 10 at any given time.

An unexpected change in product level may be, for example, a drop or an increase in product level relative to the expected product level that exceeds a level change threshold. The level change threshold may be a predetermined threshold (e.g., a fixed amount of product or percentage of the capacity of the container 12), or may be a certain number of standard deviations from a mean value of the expected change in product level calculated for the day in question. This type of change in product level may be flagged or otherwise brought to the attention of a user of the reservoir 10, a supplier of the product 14, or other interested party. Unexpected changes in product level may occur in cases where product is removed from the reservoir (e.g., stolen), or where a liquid (e.g., water or a substitute product) is added to the container 12 in order to top up the reservoir 10. The container 12 may be topped off with something other than product 14, for example, to mask the absence of product 14 (out of stock) or to save money where a low cost product is substituted for the normal product 14.

Embodiments of the invention may also be configured to identify abnormalities that occur while the reservoir 10 is in use. For example, the amount of product 14 dispensed per unit volume of diluent by a venturi-based dispenser is typically controlled by a metering tip, which is placed between the source of product and a throat of the venturi to control the amount of product 14 drawn by venturi-based dispensing systems. Metering tips are commonly made of plastic, and have apertures sized to control the flow of product 14. In certain applications, metering tips may have apertures as small as a few thousandths of an inch, e.g., 0.006 inches. Due to their small size, apertures can become restricted or blocked, which reduces the amount of product 14 dispensed per unit volume of diluent. By measuring the product level along with number and duration of operations, embodiments of the invention may determine if a metering tip has become blocked if over time the amount of product being dispensed per dispensing operation or for a cumulative duration of dispensing operations has dropped.

Figure 6:
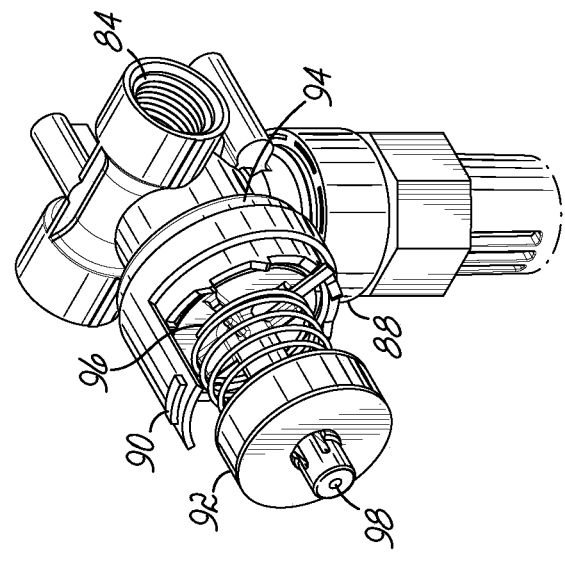
FIG. 6 is a perspective view of the dispenser of FIG. 5.
Figure 5:
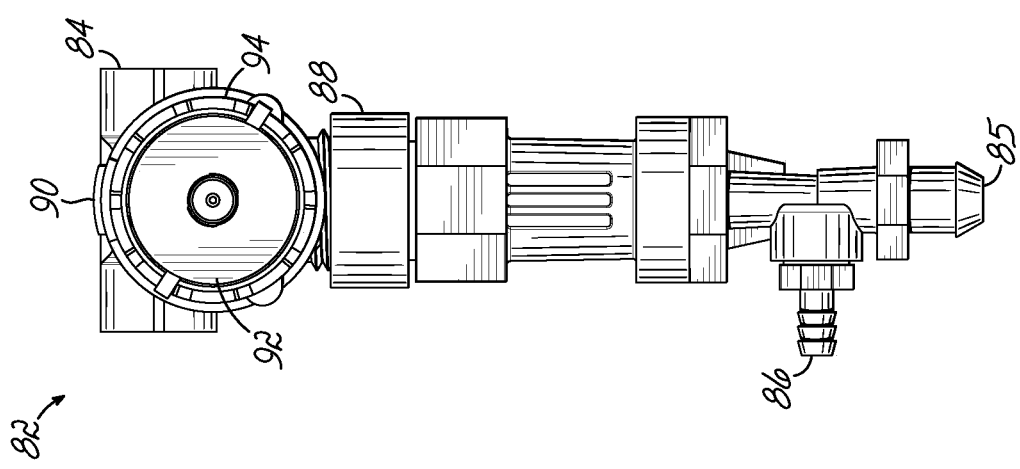
FIG. 5 is a front view of a dispenser which may be used with the reservoirs of FIGS. 1 and 3.

FIG. 5 presents a front view of a dispenser 82 (e.g., an eductor) and FIG. 6 presents a perspective view of a top portion of the dispenser 82. The dispenser 82 may include an input port 84 that is fluidically coupled to an output port 85 by a venturi. The venturi may include a converging passage, a throat, and a diverging passage. The converging passage may fluidically couple pressurized water provided to the input port 84 to an upstream end of the throat, and the diverging passage may fluidically couple a downstream end of the throat to the output port 85. The throat of the venturi may be fluidically coupled to a pickup port 86. The throat may have a reduced cross-sectional area as compared to passages coupling the venturi to the input and output ports. The reduced cross-sectional area of the throat may cause water to flow at a higher velocity than in the intake and output passages, thereby generating suction at the pickup port 86. The flow of water through the venturi may thereby cause the venturi to draw product 14 from the reservoir 10 through the pickup port 86 and into the throat of the venturi, where the product 14 mixes with the water and is discharged through the output port 85 as a diluted chemical solution.

The dispenser 82 may further include a flow switch, a flow control device 88, an activation sensor 90, and a magnet 92. The flow switch may be configured to detect a flow of water between the input port 84 and the venturi when that flow exceeds a predetermined set point, and output a binary signal (e.g., TRUE or FALSE) indicating that the flow is either above or below the set point. To this end, the flow switch may use a micro switch that closes when the predetermined water flow rate is reached. Detecting the flow of water through the dispenser 82 may be preferred to sensing the pressure of the water alone, e.g., by a pressure sensor operatively coupled to the source of water. The flow switch may enable the dispensing system to determine when there is an insufficient flow of water through the dispenser 82 to reliably draw product 14 from the reservoir 10.

The flow control device 88 may control the flow of water by mechanically limiting the flow to a maximum level. Above the maximum level, the flow of water through the flow control device 88 may flatten off. The activation sensor 90 may include a magnetic proximity sensor that detects when the magnet 92 moves inward toward the sensor. A number of times the dispenser 82 has been operated, or "number of operations", may thereby be determined based on signals receive from the activation sensor 90.

The dispenser 82 may include a shut-off valve 94 that controls the flow of water between the input port 84 and the venturi of the dispenser 82. The shut-off valve 94 may be a poppet-actuated diaphragm valve that includes an elastic member 96 disposed adjacent to the magnet 92. When the magnet 92 is held by the elastic member 96 in a resting position away from the shut-off valve 94, the shut-off valve 94 may be in a closed position that restricts the flow of water into the dispenser 82. When the magnet 92 moves toward the shut-off valve 94 (e.g., in response to a user pressing a button on the dispenser), the shut-off valve 94 may be actuated into an open position by the magnet 92 so that water flows through the shut-off valve 94. The magnet 92 may slide along a valve stem 98 that locates the magnet 92 axially with respect to the shut-off valve 94. Movement of the magnet 92 may be constrained to prevent the elastic member 96 from urging the magnet 92 beyond the end of the valve stem 98 when the dispenser is in an inactive state. Another elastic member (not shown) may be configured to urge the shut-off valve 94 back into a closed state when the magnet 92 moves away from the shut-off valve 94.

Venturi-based dispensers often use check valves to couple the pickup port to a product supply line. These check valves may be mechanically stressed and have internal components that are continuously exposed to concentrated chemicals. This can lead to premature failure of the check valve. Debris in the product supply line can also cause a check valve to fail. When a check valve coupling product 14 to a dispenser fails, it can cause the product 14 to drop back down the pickup tube. This can cause a delay in product 14 being mixed with diluent due to the need for the dispenser to draw the product 14 back up into the pickup tube each time a dispensing operation occurs. A failed check valve can thereby affect the amount of product 14 delivered during a dispense cycle. Failed check valves can also allow diluent to flow through the product supply line and into the product container 12, which can fill the container 12 and cause product 14 and diluent to overflow onto the floor. By monitoring the product level, embodiments of the invention may allow early detection of failed check valves based on an abnormal (e.g., rising) product level.

Figure 8:
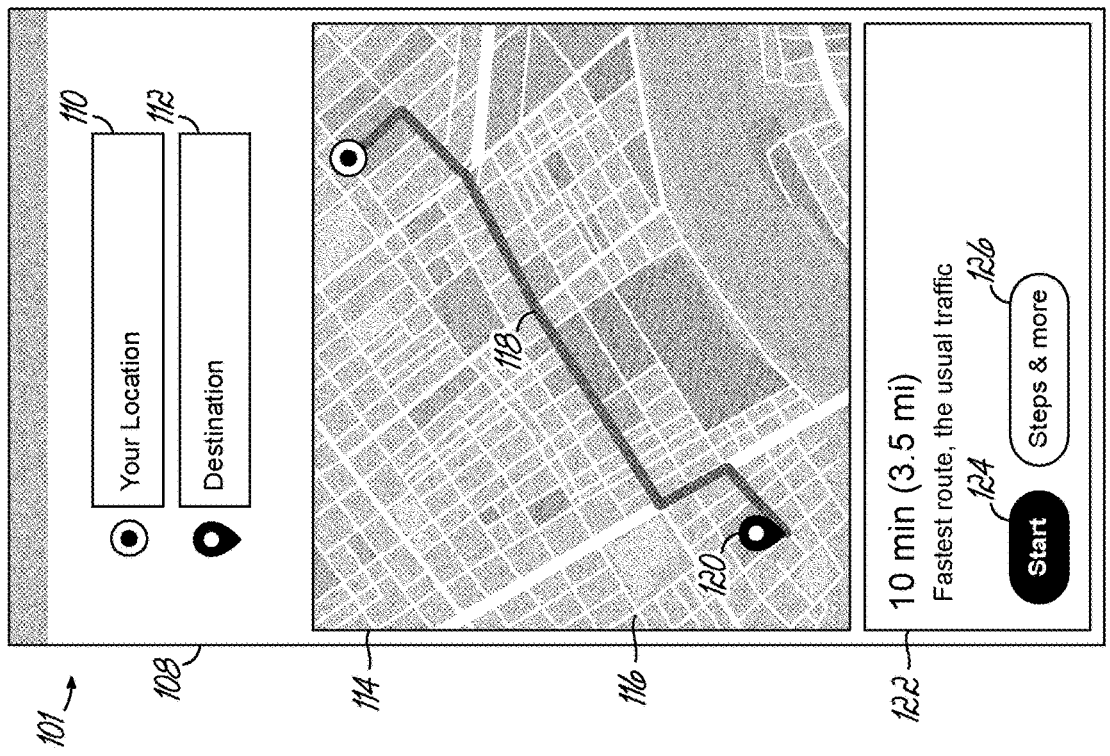
FIGS. 7 and 8 are diagrammatic views depicting screens which may be displayed by the mobile device of FIG. 3.
Figure 7:
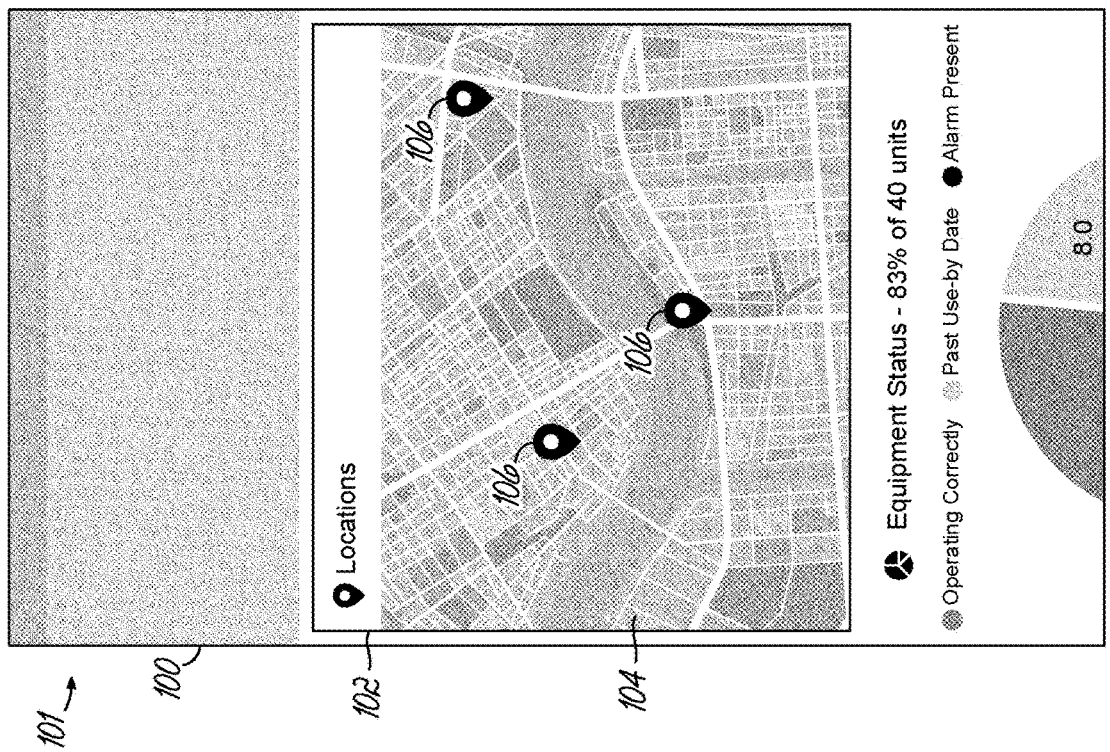

FIG. 7 depicts an exemplary screen 100 of a user interface 101 (e.g., a graphical user interface (GUI)) that may be displayed by the mobile device 54. The screen 100 may include a window 102 displaying a map 104 having icons 106 indicative of customer site locations. FIG. 8 depicts another exemplary screen 108 of the user interface 101 including a plurality of data entry fields 110, 112 and a window 114 displaying a map 116. The map 116 includes a route 118 to a location icon 120 associated with customer site. A data display window 122 of the screen 108 may provide information relating to the route 118, such as distance and expected travel time, and may include one or more buttons 124, 126 to activate features of the application, e.g., start a navigation process or open a pop-up window providing additional information.

The user interface may facilitate managing equipment in the field by displaying information that identifies the location of each dispensing system, when each system was installed, the type and locations of equipment installed at each site, the age and maintenance history (e.g., maintenance, refurbishment, replacement, etc.) of each piece of equipment, usage (e.g., type of product and number of dispensing operations). Each dispensing system may include one or more unique identifiers that facilitate retrieval of this information from a central database. Each dispensing system may also be associated with a platform identifier, an equipment sub-type classification, and manufacturing details.

Advantages of embodiments of the invention over conventional dispensing systems include a level sensor 26 that detects the amount of product 14 remaining without being submerged in the product 14. Based on the shape of the container 12, the level sensor 26 may determine actual volume of the remaining product 14 in the container 12. The dispensing system may also include a clock that enables the system to detect product usage at intervals between service visits. This clock may be a real-time clock that enables the reservoir 10 to organize data on a daily interval, and may be set by synchronization with the time and date of the mobile device 54. The system may gather and interpret dispenser usage data, determine when there is any unexpected deficit or surplus of product 14, and detect low product conditions. The dispensing system may also remind service personnel when they need to replenish product 14 by analyzing data downloaded into the mobile device 54.

The reservoir 10 may include a power source, such as a battery, that allows operation independent of a connection to the power grid. To conserve power in embodiments of the invention which run off of an internal power source, the periodic level readings may be taken relatively infrequently, e.g., every 24 hours. Readings may also be taken each time the reservoir cabinet lid has been raised, e.g. before and after the lid has been opened, to detect if product has been added or removed from the reservoir 10.

For embodiments of the invention which are connected to the power grid, readings may be taken more frequently. For example, readings could be taken based on time alone (i.e., taken every 15, 30 or 60 minutes), or based on usage of one or more dispensers that draw product from the reservoir 10. The frequency and conditions under which readings are taken may be user adjustable so that the reservoir 10 can be tailored for the user's specific application. For example, in a laundry environment, the readings may be scheduled either after every wash cycle or after every 'x' seconds of operation. In cases where readings are taken every few seconds, the readings could be taken without regard to washing cycles. The length of time between readings may also depend on the accuracy of the level sensor 26, with sensors having higher accuracy supporting more frequent readings.

Alarm conditions may include out of product, low product, incorrect use of dispenser (operations that are too short/long for the type of dispensing expected), and unexpected product level, which may be determined by comparing an amount of product determined from the level sensor 26 to an amount of product dispensed. The amount of product dispensed may be determined independently of the level sensor 26 based on activation times of the dispenser 82, and this amount compared to the amount determined by the level sensor 26. Data analysis may include usage data, the presence of water flow, the presence of product 14, a depletion rate of product 14 over multiple dispensing operations, and a determination as to whether service visits are occurring often enough.

Different types of alarm conditions may be set based on the product level exceeding a threshold, such as a low-level threshold or a high-level threshold. For example, an out of product condition may be set in response to determining the product level has fallen below a low-threshold level, e.g., due to the surface 40 of product 14 dropping below a predetermined level in the container 12. A high-level condition may be set in response to determining the product level has risen above a high-level threshold, or in response to any increase in the product level that occurs without the lid 22 having been opened. A high-level condition may be indicative of a check valve failure, as described above.

In response to detecting an out of product condition, the reservoir 10 may activate an alarm signal, e.g., such as a buzzer or flashing light. The alarm signal may be constant in nature (e.g., having a fixed amplitude, frequency, or rate), or the alarm signal may change as the level of the product drops further below (or rises further above) the threshold level. For example, the alarm signal could get louder, higher in frequency, or flash/buzz at a more rapid rate as the product level exceeds the threshold level by increasing amounts. The alarm signal could also have different characteristics to indicate whether it is due to a low-level condition or a high-level condition.

In response to detecting an alarm condition, the computing device detecting the alarm condition, or another computing device in communication with the detecting computing device, may issue an alarm that notifies appropriate personnel of the alarm condition. In addition to audible or visible alarms, alarm conditions may trigger electronic notifications, such as email and text messages.

Figure 9:
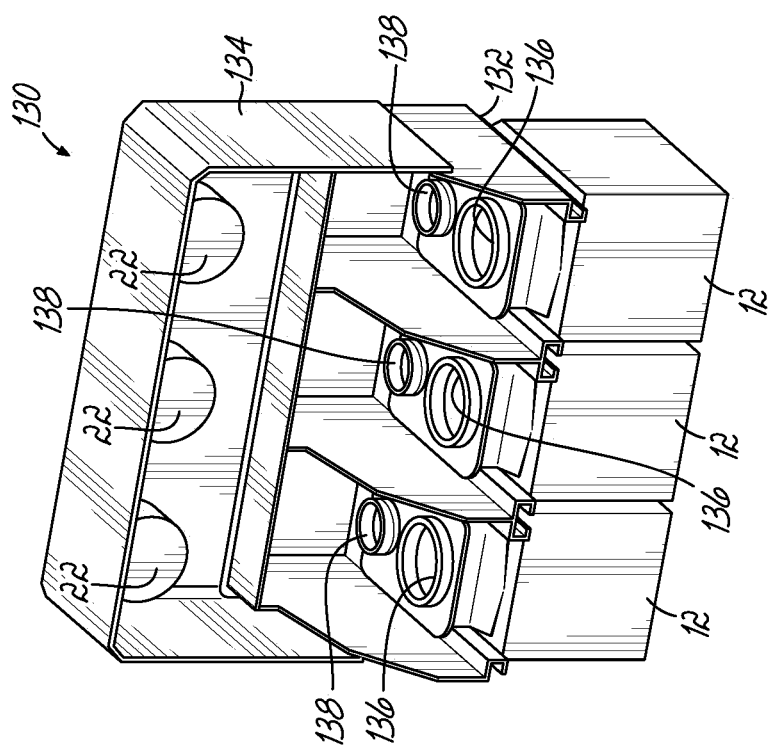
FIG. 9 is a perspective view of a reservoir including multiple containers.

FIG. 9 depicts an embodiment of the invention in which a reservoir 130 includes a plurality of (e.g., three) containers 12 mechanically coupled to a frame 132. A common cover 134 may be pivotally coupled to the frame 132 and mechanically coupled to a plurality (e.g., three) lids 22, e.g., one lid 22 for each container 12. The cover 134 may include a device for detecting when the cover 134 is open or closed. This device may include, for example, a magnet mounted to the cover 134 that aligns with a magnetic proximity sensor mounted to the frame 132 when the cover 134 is in a closed position. The cover 134 may be configured so that when it is in an open position (depicted), access is provided to one or more openings 136, 138 on each container 12, and when the cover 134 is in a closed position, the level sensors 26 are positioned proximate to at least one of the one or more openings 136, 138 so that the level sensor 26 has an unobstructed path to the surface 40 of product 14.

In another embodiment of the invention, the level sensor 26 may be integrated into a removable cover assembly that includes a pickup tube and a lid which is screwed onto the container 12, similar to a pickup stem. In this embodiment, the level sensor 26 could be a remote device powered from a dispenser or low-level alarm unit.

Figure 10:
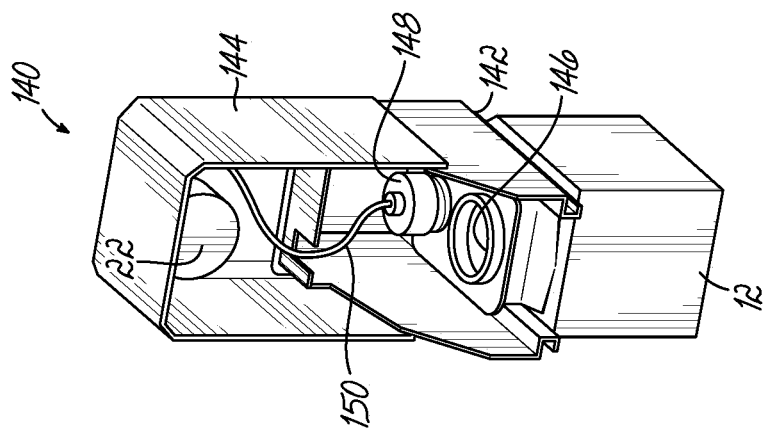
FIG. 10 is a perspective view of a reservoir including a single container.

FIG. 10 depicts an embodiment of the invention in which a reservoir 140 includes one container 12 mechanically coupled to a frame 142, and a cover 144 pivotally coupled to the frame 142. The cover 144 may be configured so that when it is in an open position (depicted), access is provided to an opening 146 of the container 12 (e.g., for adding product 14 to the container 12) and to a lid 148 that couples a product supply line 150 to another opening of the container 12 (e.g., for receiving a pickup tube). When in the closed position, the cover 144 may be configured to position the level sensor 26 proximate to the opening 146 of container 12.

Reservoirs may be provided with one or more option levels. For example, one option level may only detect product level. Another option level may detect product level and dispenser activation. Still another option level may detect product level, dispenser activation, and water flow.

Figure 11:
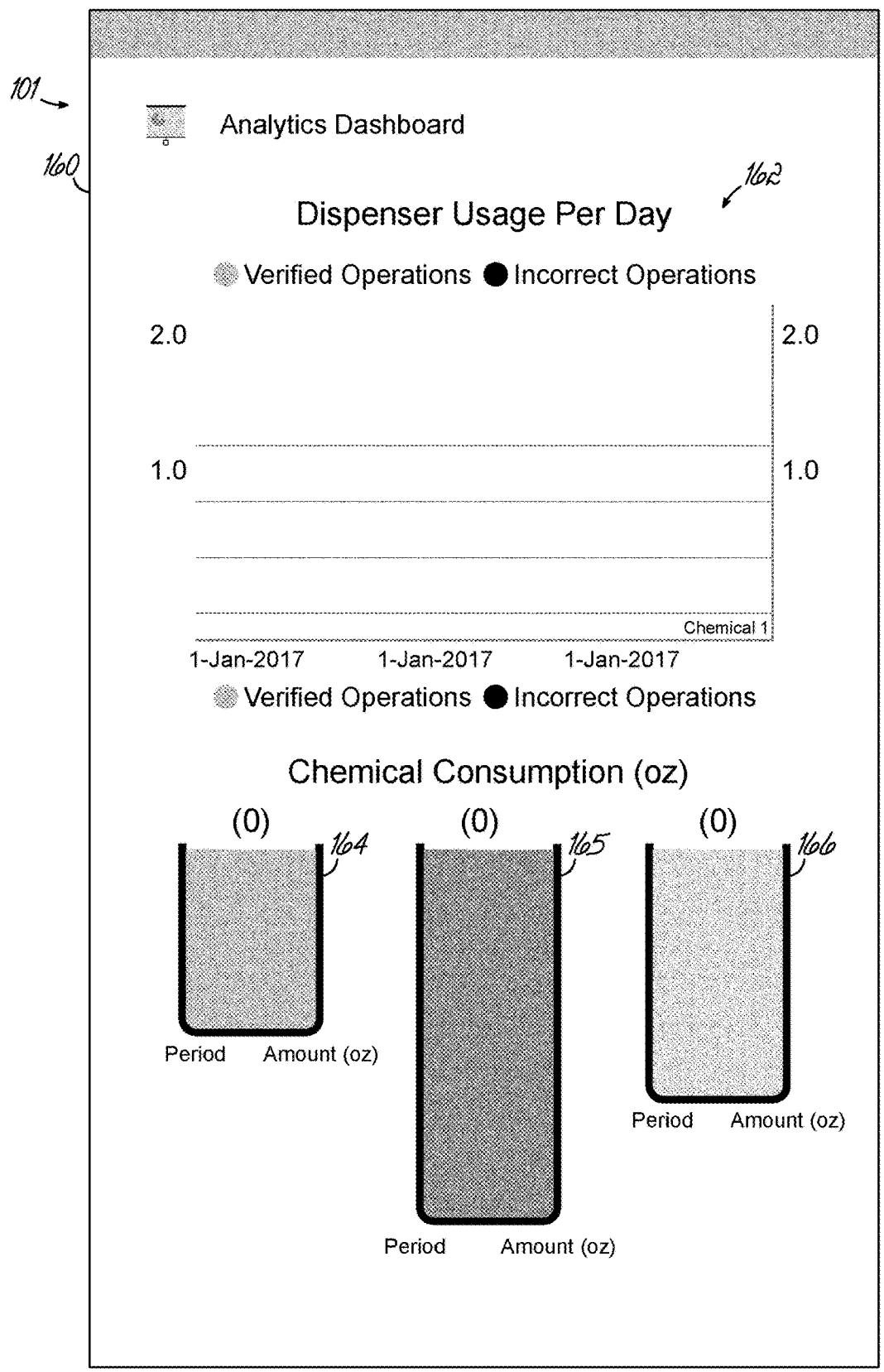
FIGS. 11 and 12 are diagrammatic views depicting screens which may be displayed by the mobile device of FIG. 3 during installation of a reservoir.

FIG. 11 depicts another exemplary screen 160 of user interface 101 that may be displayed by the mobile device 54 when equipment is installed at a customer site. The screen 160 may include a window 162 that displays an analytics dashboard. The analytics dashboard may include one or more graphic elements (e.g., bars 167, 168 (FIG. 12) of a bar graph) that indicate the number of verified operations and incorrect operations per day over a number of days, and a consumption of one or more products 14 dispensed from the reservoir 10.

After new equipment is physically installed into a customer site, the dispenser system (which may include one or more reservoirs 10 and product dispensers 82) may be synchronized with the mobile device 54. This process may include the application on the mobile device 54 detecting one or more UIDs of reservoirs 10, containers 12, or dispensers 82. Based on the UIDs detected, the application may provide instructions or other information that prompts or guides an installer through installation of one or more reservoirs 10, containers 12 of product 14, dispensers 82, metering tips, etc.

For example, in response to the cover 134, 144 being closed, the application may cause the user interface 101 to indicate what sizes of container are in place, e.g., by displaying one or more icons 164-166. The sizes of the containers 12 may be determined, for example, by a respective level sensor 26 detecting a distance to the bottom of the interior surface 30 of each container 12 coupled to the reservoir 10. The distance measurements may allow the application to determine which of several sizes of container 12 (e.g., three sizes) has been installed.

Figure 12:
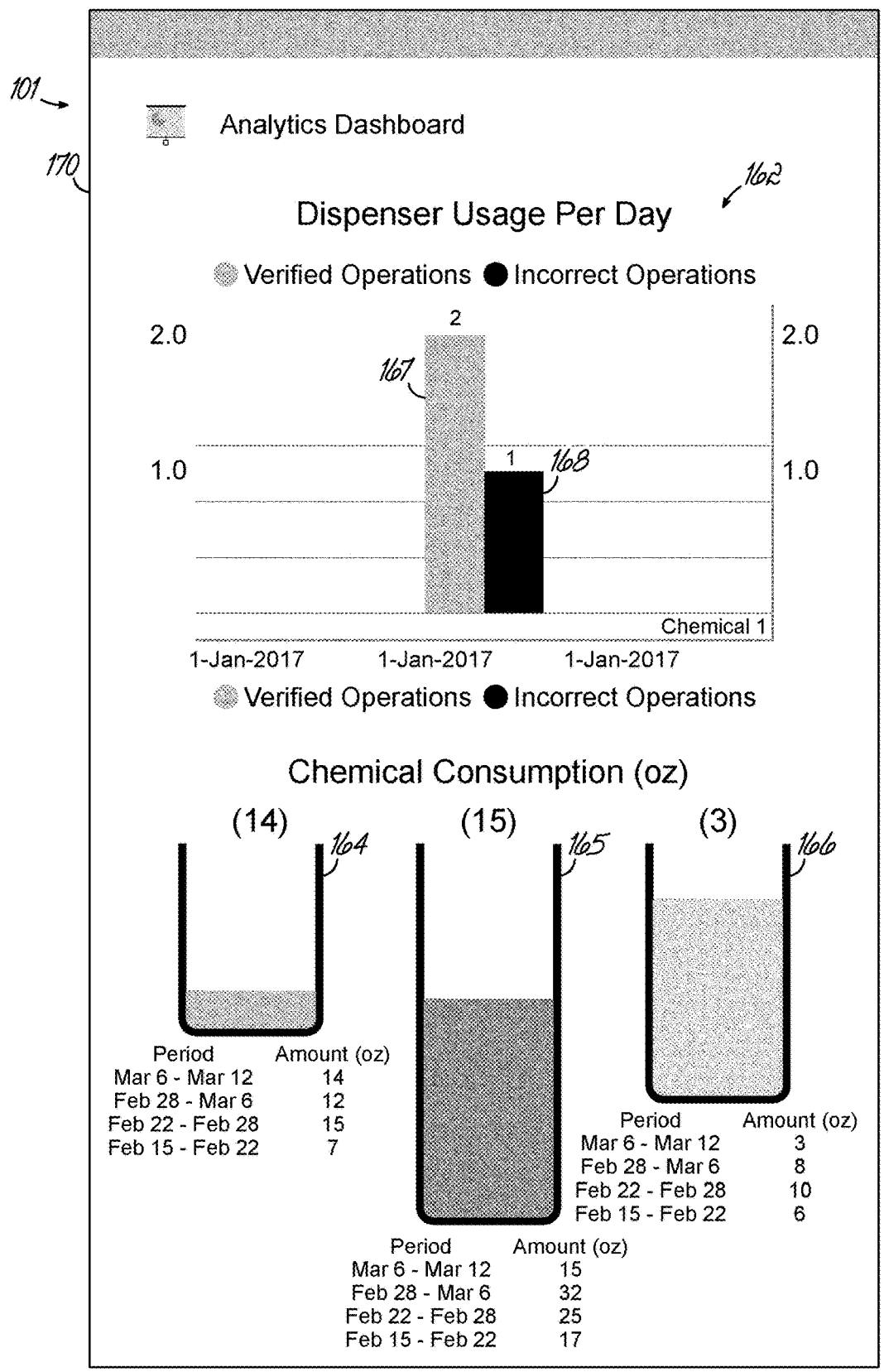

Once the sizes of the containers 12 have been determined, the application may prompt the installer to open the cover 134, 144 and fill the reservoirs 130, 140 with appropriate products 14. The application may then prompt the installer to prime the dispenser followed by a topping off of the products 14. The application may then direct the user to re-sync the data with the dispenser system to upload the settings. In response to closing the cover 134, 144, the product levels may be determined and stored as baseline reference levels for determining product usage during a later service visit. The installation of the reservoir 10 may now be complete FIG. 12 depicts the user interface 101 including a screen 170 displaying a window 162 and icons 164-168 in accordance with a support service visit. The screen 170 may be displayed, for example, by the mobile device 54 in response to the mobile device 54 returning to the dispensing system described above with respect to FIG. 11. In an embodiment of the invention, as the service technician approaches the dispensing system, the application may synchronize its data with the operational data stored in one or more components of the dispensing system. This synchronization may include downloading data from the level sensor 26 that includes product level data and dispensing operation data acquired since the last service visit. The application may use this data to adjust the icons 164-165 to indicate the level of product 14 in each container 12, and may prompt the service technician to refill one or more of the containers 12. Once the containers 12 are refilled and the cover closed, the application may reset the baseline product levels as described above with respect to FIG. 11.

Figure 13:
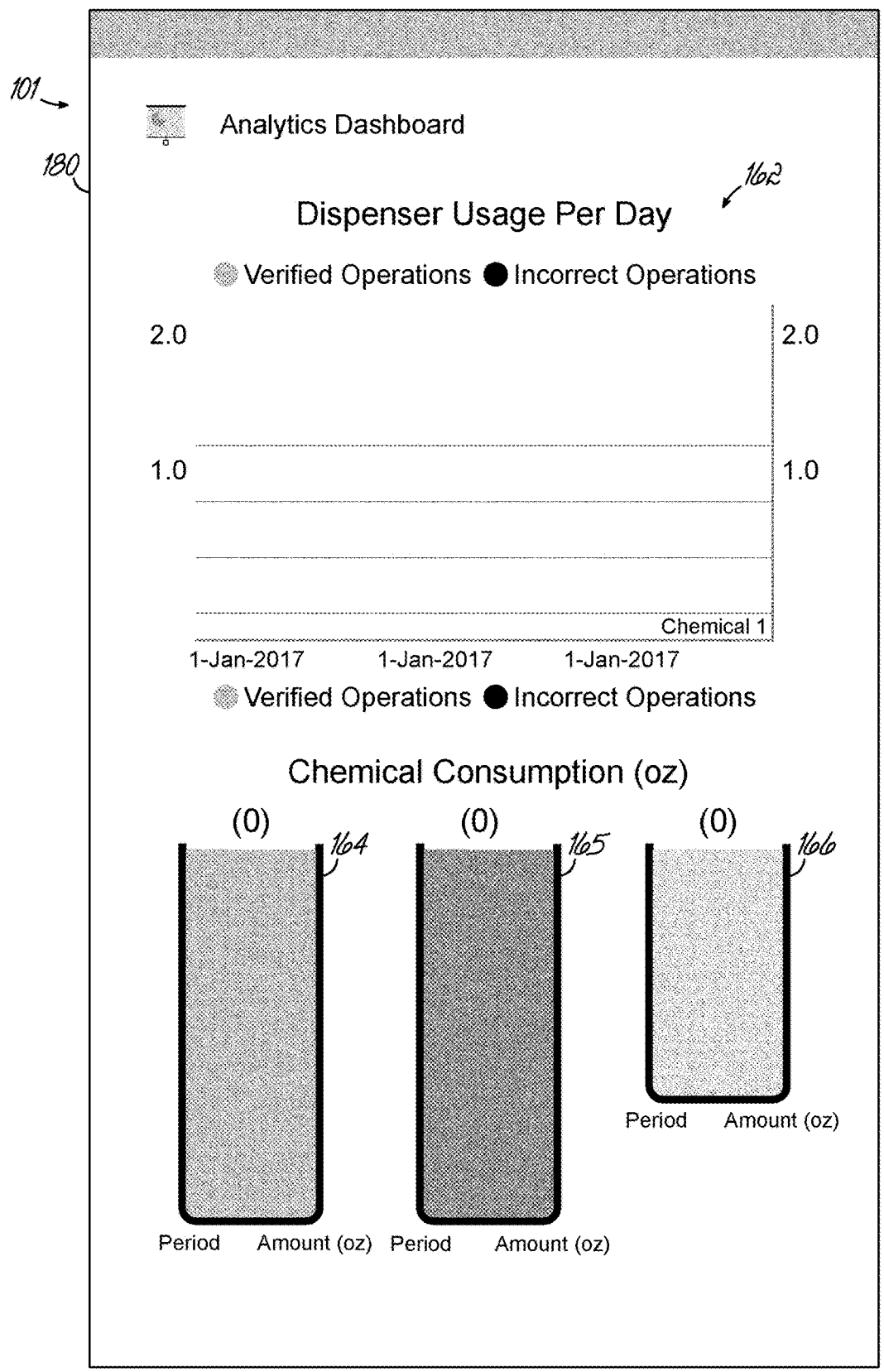
FIG. 13 is a diagrammatic view depicting a screen which may be displayed by the mobile device of FIG. 3 while changing the setup of a reservoir.
Figure 14:
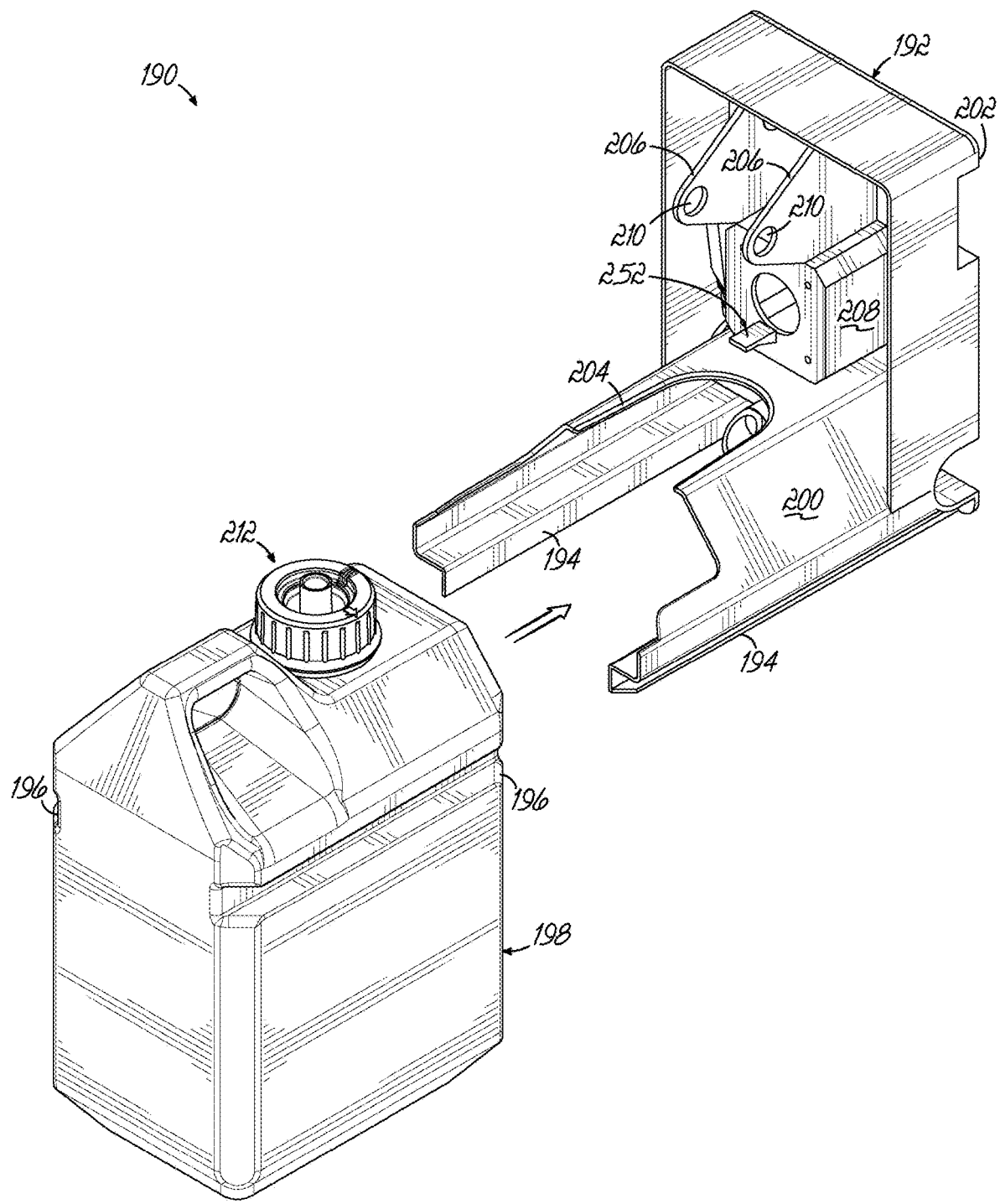
FIG. 14 is a perspective view of a reservoir in accordance with an embodiment of the invention depicting a container including a connector assembly and which has yet to be installed in the reservoir.
Figure 15:
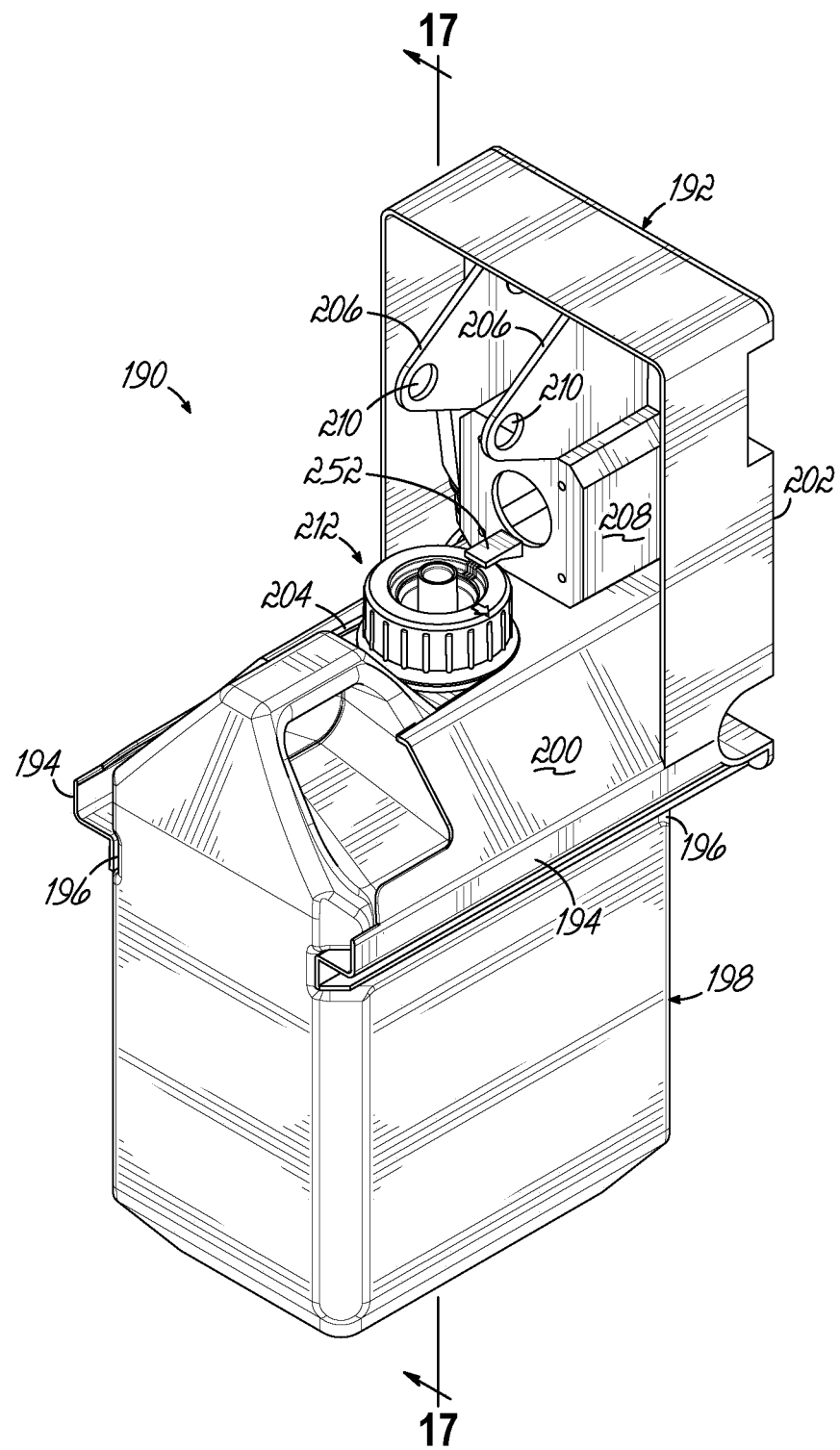
FIG. 15 is a perspective view of the reservoir of FIG. 14 with the container installed in the reservoir.

Referring now to FIG. 13, during a visit to the customer site for a change of setup, the application may synchronize the operational data stored in the database as the service technician approaches within range of the dispensing system. During synchronization, dispenser operational data and product usage data may be downloaded from one or both of the reservoir 10 and dispenser 82. Product usage data may include product usage determined from operational data, e.g., the number and duration of dispensing operations, and product usage determined from product level data. During the change of setup, a different size container 12 may be fitted to the reservoir 10, e.g., in response to a product 14 running out between service visits.

As described above with respect to FIG. 11, the level sensor 26 may detect this change in container size when the cover is closed, and update configuration data in the reservoir 10. The cover may then be re-opened and the containers 12 filled or refilled and the cover closed. In response to the cover being closed, the levels of product 14 stored in the database may be updated. In response to this data being downloaded by the mobile application, the icon of the changed container 12 (e.g., icon 164) may be updated to reflect the change in the size of the container 12 as depicted by screen 180.

FIGS. 14-17 depict a reservoir 190 in accordance with an embodiment of the invention. The reservoir 190 includes a frame 192 having rails 194 that project outward in a generally horizontal direction. The rails 194 are configured to engage corresponding channels 196 on a container 198, and to hold the container 198 in an operational position after the container has been installed in the reservoir 190. The container 198 may be installed in the reservoir 190 by aligning the channels 196 with the rails 194, and sliding the container 198 into the operational position depicted in FIG. 15.

A structural shell 200 couples the rails 194 to each other and to a back-panel 202 to increase the structural integrity of the frame 192. The structural shell 200 includes an opening 204 configured to accommodate a top portion of the container 198. The opening 204 may be configured to provide a stop which prevents the container 198 from being inserted beyond the operational position. The frame 192 further includes a cover mount comprising a plurality (e.g., two) brackets 206, and an enclosure 208. Each bracket 206 includes an aperture 210 so that the brackets 206 provide a gudgeon into which a pintle or other suitable member may be inserted to pivotally couple a cover or other component to the frame 192.

Figure 17:
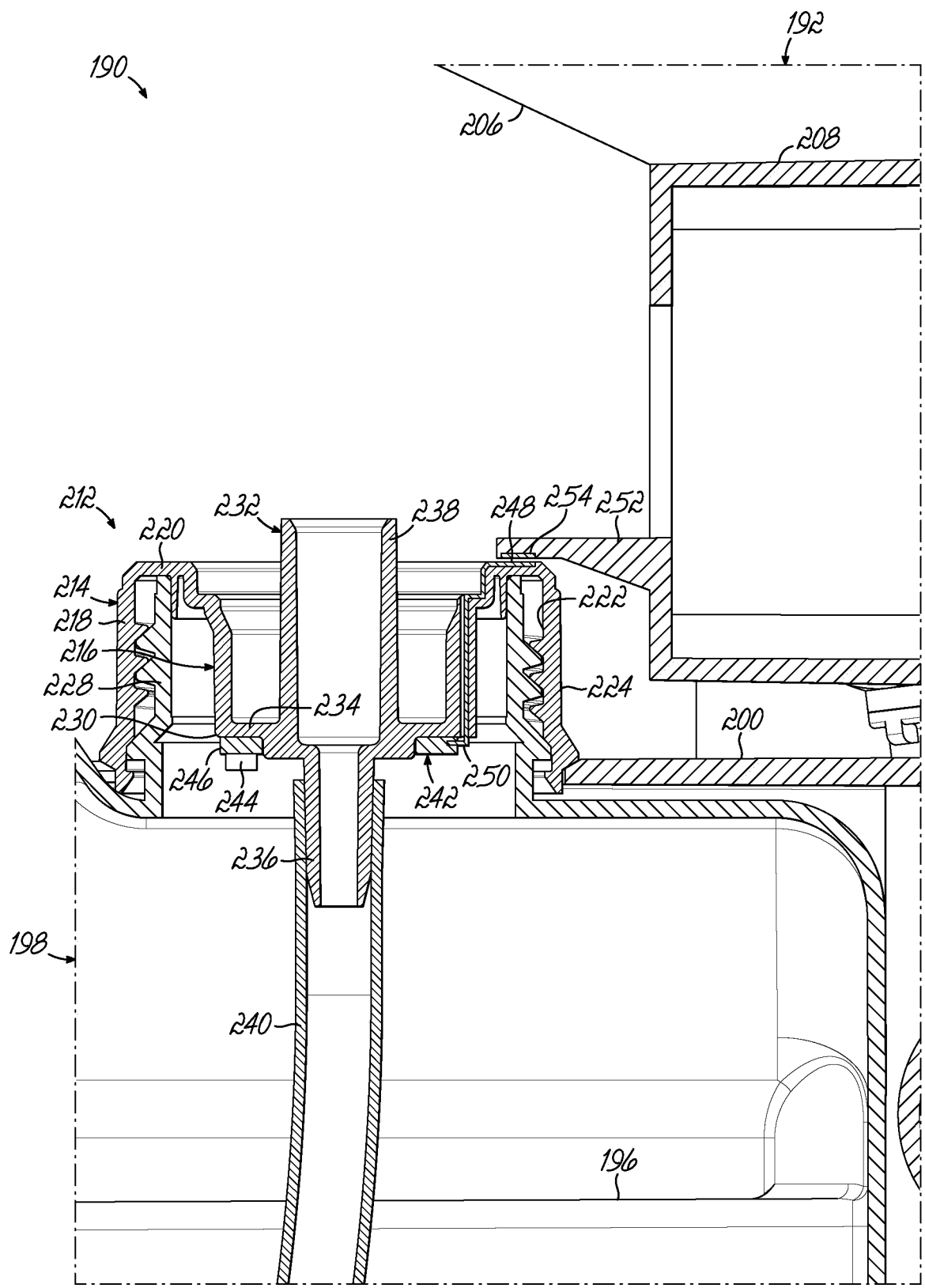
FIG. 17 is a cross-sectional view of the reservoir of FIG. 15 showing additional details of the connector assembly.

In operation, a connector assembly 212 configured to receive a product supply line may be operatively coupled to the container 198. As best shown by FIG. 17, the connector assembly 212 includes a collar 214 and a lid 216. The collar 214 includes a cylindrical wall 218 and an annulus 220. The annulus 220 projects inward from a top edge of the cylindrical wall 218 and couples the collar 214 to the lid 216. The cylindrical wall 218 of collar 214 includes an inner surface 222 and an outer surface 224.

The container 198 includes a neck finish 228 disposed about an opening of the container 198. The inner surface 222 of collar 214 may include threads or some other suitable feature configured to engage a corresponding feature of the neck finish 228 when the connector assembly 212 is coupled to the container 198. The outer surface 224 of cylindrical wall 218 may have ribs or some other surface feature suitable for gripping. The collar 214 and lid 216 are sized and shaped so as to receive the neck finish 228 therebetween when the connector assembly 212 is coupled to the container 198, e.g., by screwing the connector assembly 212 onto the neck finish 228. When the collar 214 is coupled to the container 198, the collar 214 holds the lid 216 in place over the opening of the container 198.

A bottom portion 230 of lid 216 may be joined to a fluidic coupler 232 by an annulus 234 so that the fluidic coupler 232 is centrally positioned with respect to the lid 216. The fluidic coupler 232 may have a lower portion 236 that projects downward into the container 198 and an upper portion 238 that projects upward away from the container 198 when the connector assembly 212 is attached to the container 198. The lower portion 236 of fluidic coupler 232 may be fluidically coupled to a pickup tube 240 that projects downward into the container 198. The upper portion 238 of fluidic coupler 232 is configured to receive a product supply line.

Figure 16:
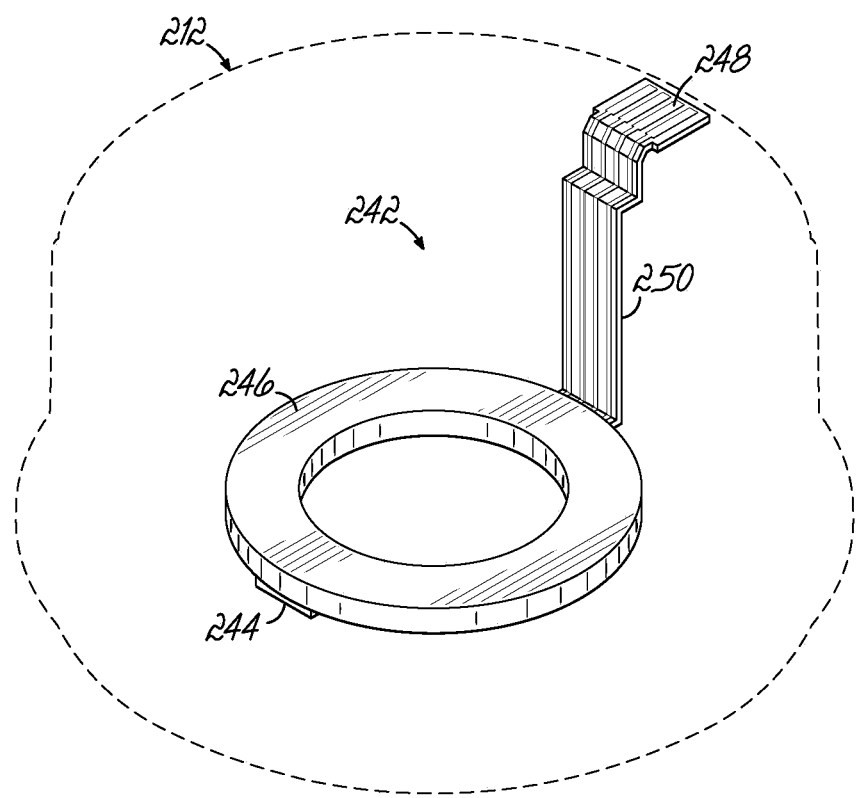
FIG. 16 is a perspective view of the connector assembly with certain components of the connector assembly hidden to show a level sensor assembly.

As best shown by FIG. 16, the connector assembly 212 includes a sensor assembly 242 configured to determine the amount of product in the container 198. The sensor assembly 242 includes a level sensor 244 mechanically coupled to the lid 216 by a support ring 246, and electrically coupled to a multi-pin connector 248 by a ribbon cable 250 and one or more conductive elements (not shown) embedded in the support ring 246. The support ring 246, multi-pin connector 248, and ribbon cable 250 may be integrated with or otherwise coupled to the connector assembly 212 so that the level sensor 244 faces downward into the container 198 when the connector assembly 212 is coupled to the container 198.

A projection 252 projecting outward from the frame 192 (e.g., an external surface of enclosure 208) includes a multi-pin connector 254 configured to operatively couple the multi-pin connector 248 of sensor assembly 242 to an external device (e.g., a power source or computing device) when the container 198 is in the operational position. The level sensor 244 may thereby receive power from and exchange signals with external devices through the multi-pin connector 248 of sensor assembly 242.

Figure 18:
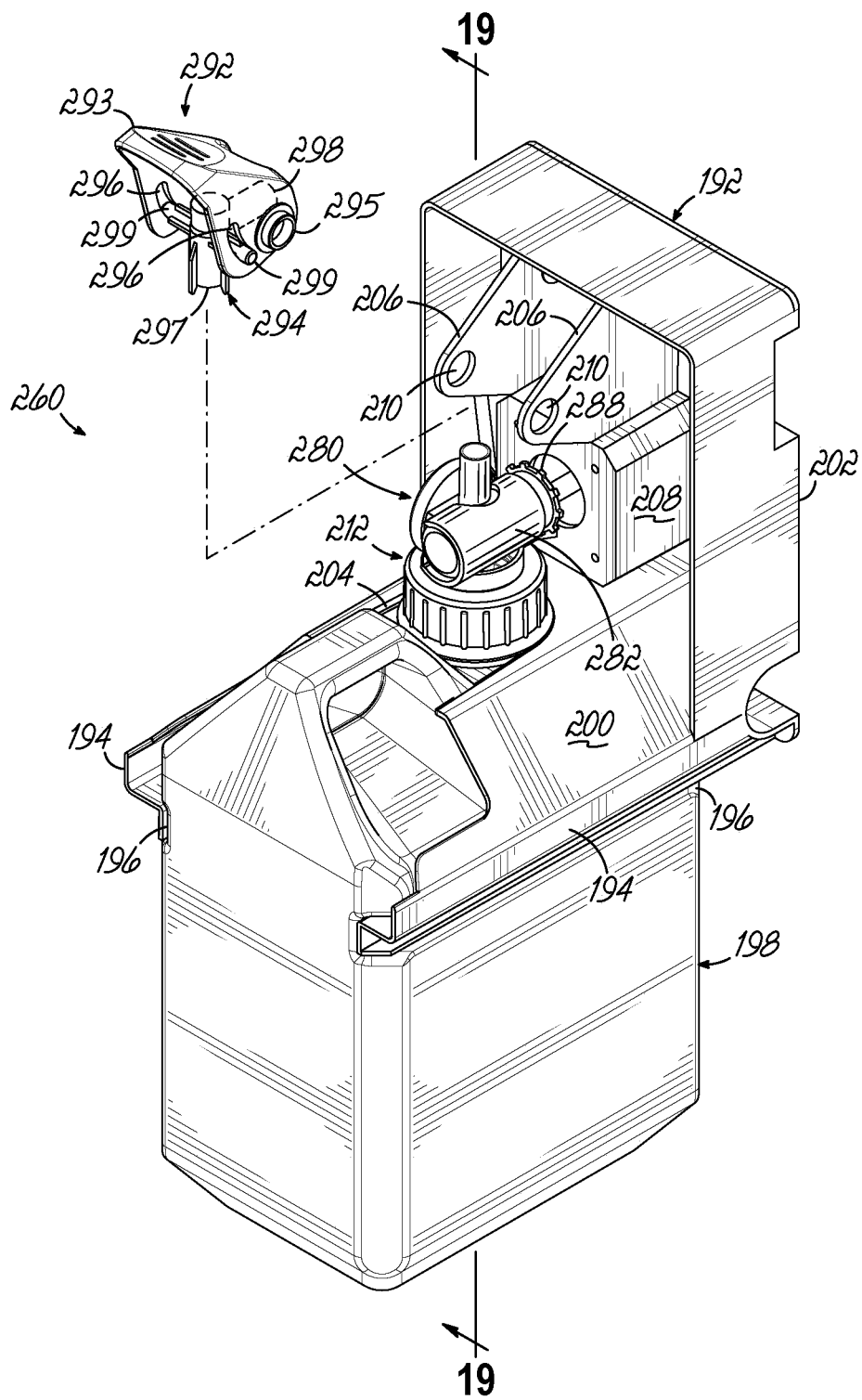
FIG. 18 is a perspective view of the reservoir of FIG. 15 depicting a connector assembly including a pump.
Figure 19:
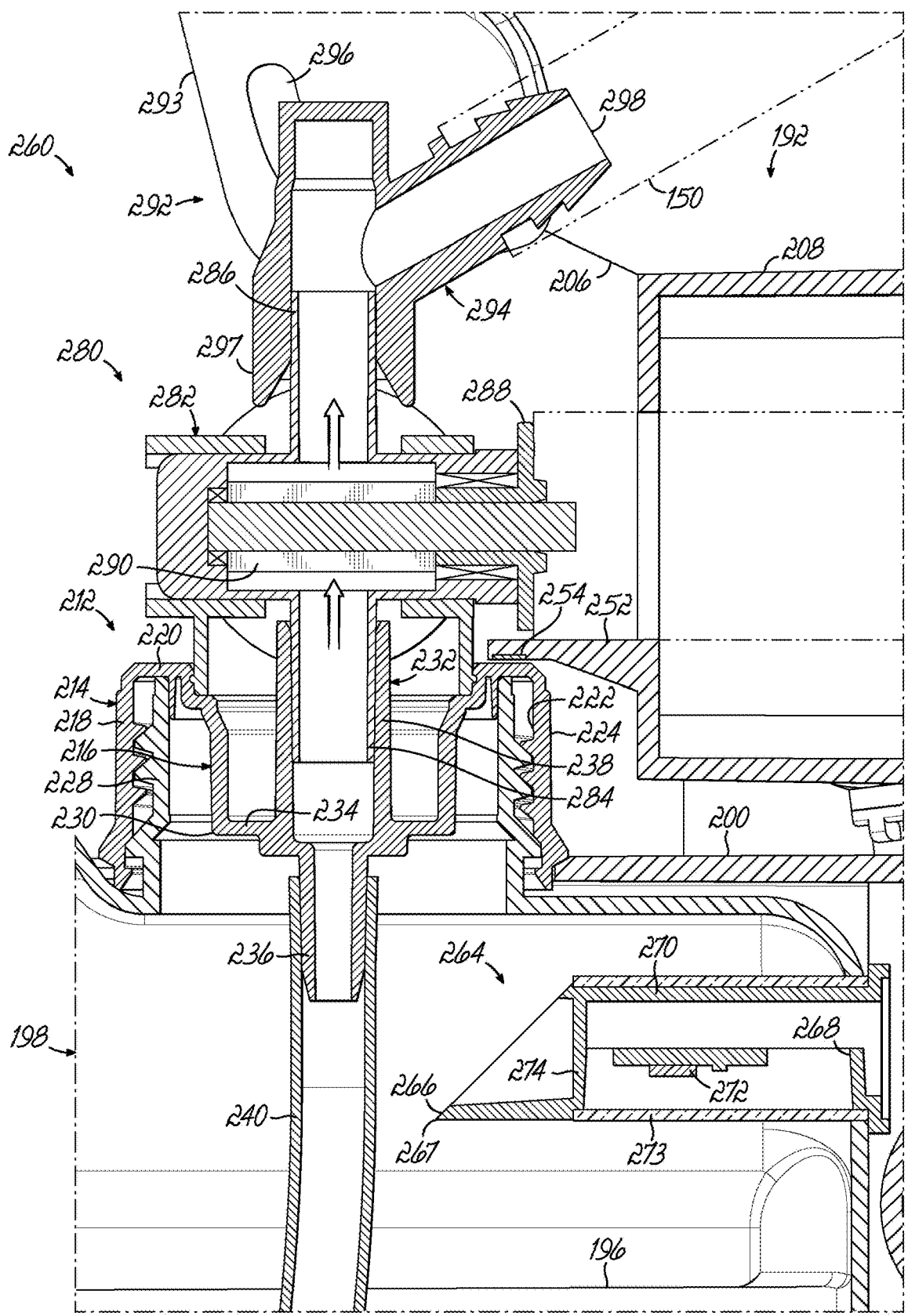
FIG. 19 is a cross-sectional view of the reservoir of FIG. 18 showing additional details of the connector assembly and pump.

FIGS. 18 and 19 depict a reservoir 260 in accordance with an embodiment of the invention that includes a shaft 264 (FIG. 19) which projects outward from the frame 192. The shaft 264 may be hollow and terminated by a bevel 266. The bevel 266 provides a cutting edge 267 configured to penetrate the container 198 when the container 198 is slid into the operating position. The portion of the bevel 266 proximate the top portion of the shaft 264 may be relatively dull as compared to the cutting edge 267 so that the cutout portion of the container 198 remains attached to the container 198, e.g., to prevent the cutout portion from blocking the pickup tube 240. An opening 268 in a sidewall 270 of shaft 264 enables a level sensor 272 mounted in the shaft 264 to transmit the output signal 38 and receive the reflected signal 42.

The bevel 266 may be angled in such a way that the cutout portion of the container 198 forms a flap which deflects upward along a top portion of the shaft 264 away from the level sensor 272. A transparent cover that covers the opening 268 may be provided by a sleeve 273 positioned on the shaft 264. A partition 274 located proximate to the bevel 266 may prevent debris or product from entering the shaft 264 and potentially interfering with operation of the level sensor 272. To facilitate operation of the shaft 264, the container 198 may include scoring, a port having a membrane, or some other suitable feature configured to receive or be cut by the shaft 264.

The reservoir 260 may be configured to receive a container 198 including a pump 280 that is integrated with the connector assembly 212. The pump 280 includes a housing 282 having an input port 284 and an output port 286. The input port 284 may configured to form a fluid-tight seal with the fluidic coupler 232 when inserted into the upper portion 238 thereof. The output port 286 may configured to form a fluid tight seal with the product supply line 150 or other fluidic member.

The pump 280 includes a splined rotor 288 or other suitable coupling element configured to engage an output shaft of a motor (not shown) when the container 198 is in the operational position. The splined rotor 288 is configured to couple torque provided by the motor to an impeller 290 of pump 280. When the impeller 290 rotates within the housing 282, the pump 280 draws product 14 into input port 284 and discharges product 14 from output port 286. The pump 280 may thereby selectively provide product 14 to a dispenser in response to activation of the motor.

The reservoir 260 may further include a lockout mechanism 292 having a handle 293 and a fitting 294. The handle 293 includes bosses 295 that project outward from the sides, and slots 296 that are cut or otherwise formed in the sides. The bosses 295 are configured to engage the apertures 210 of bracket 206 so that the handle 293 can be pivotally coupled to the frame 192 of reservoir 260. The handle 293 may be made from a material having sufficient flexibility so that the sides can be compressed inward enough to allow the bosses 295 to be inserted into the apertures 210 by sliding the handle into position in bracket 206.

The fitting 294 includes a receptacle 297 that is fluidically coupled to a nozzle 298, and posts 299. The receptacle 297 is configured to engage the output port 286 of pump 280 when the handle 293 is pivoted downward, thereby fluidically coupling the fitting 294 to the output port 286. The nozzle 298 is configured to receive the supply line 150. The supply line 150 may thereby be fluidically coupled to the output port 286 of the pump 280 by the fitting 294. The posts 299 project outward horizontally from the fitting 294 and are configured to engage the slots 296 of handle 293. The slots 296 define the movement of the fitting 294 relative to the handle 293 by guiding the posts 299 as the handle 293 is used to raise and lower the lockout mechanism 292. The slots 296 may be so sized and shaped as to cause the receptacle 297 of fitting 294 to align with the output port 286 of pump 280 when the handle 293 is pivoted from an upward position to a downward position.

Although several features are depicted by FIGS. 14-19 as being included in different exemplary embodiments, it should be understood that embodiments of the invention may include reservoirs having just the projection 252 (i.e., configured to operate with containers including the connector assembly 212), having just the shaft 264 (i.e., configured to operate with containers that do not include the connector assembly), or both the projection 252 and the shaft 264 (e.g., configured to work with both types of container). Each combination of reservoir features may also be used with or without the pump 280, as well as with different embodiments of the connector assembly.

Figure 20:
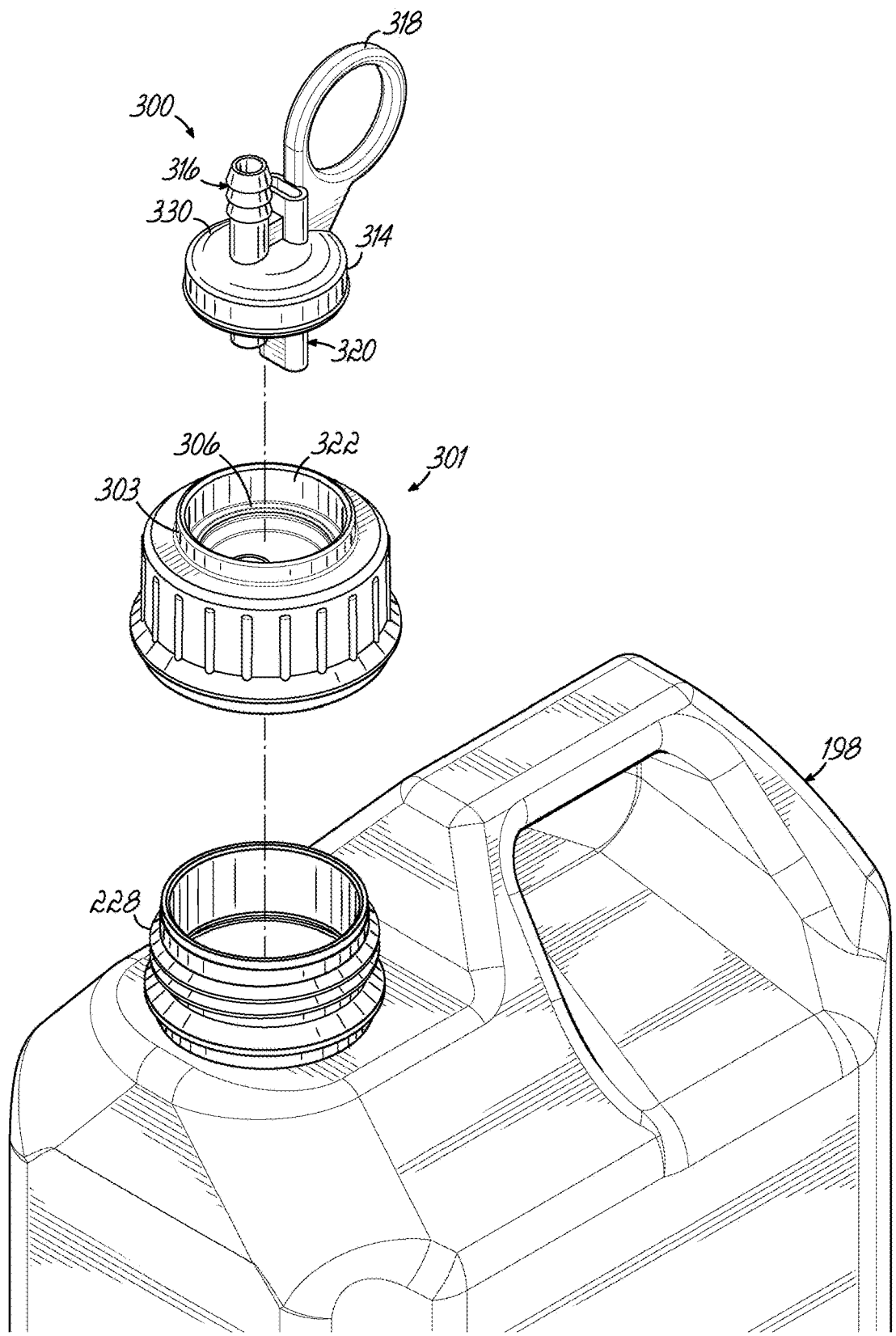
FIG. 20 is an exploded perspective view of an adapter that may be used with the container of FIGS. 14 and 15.
Figure 21:
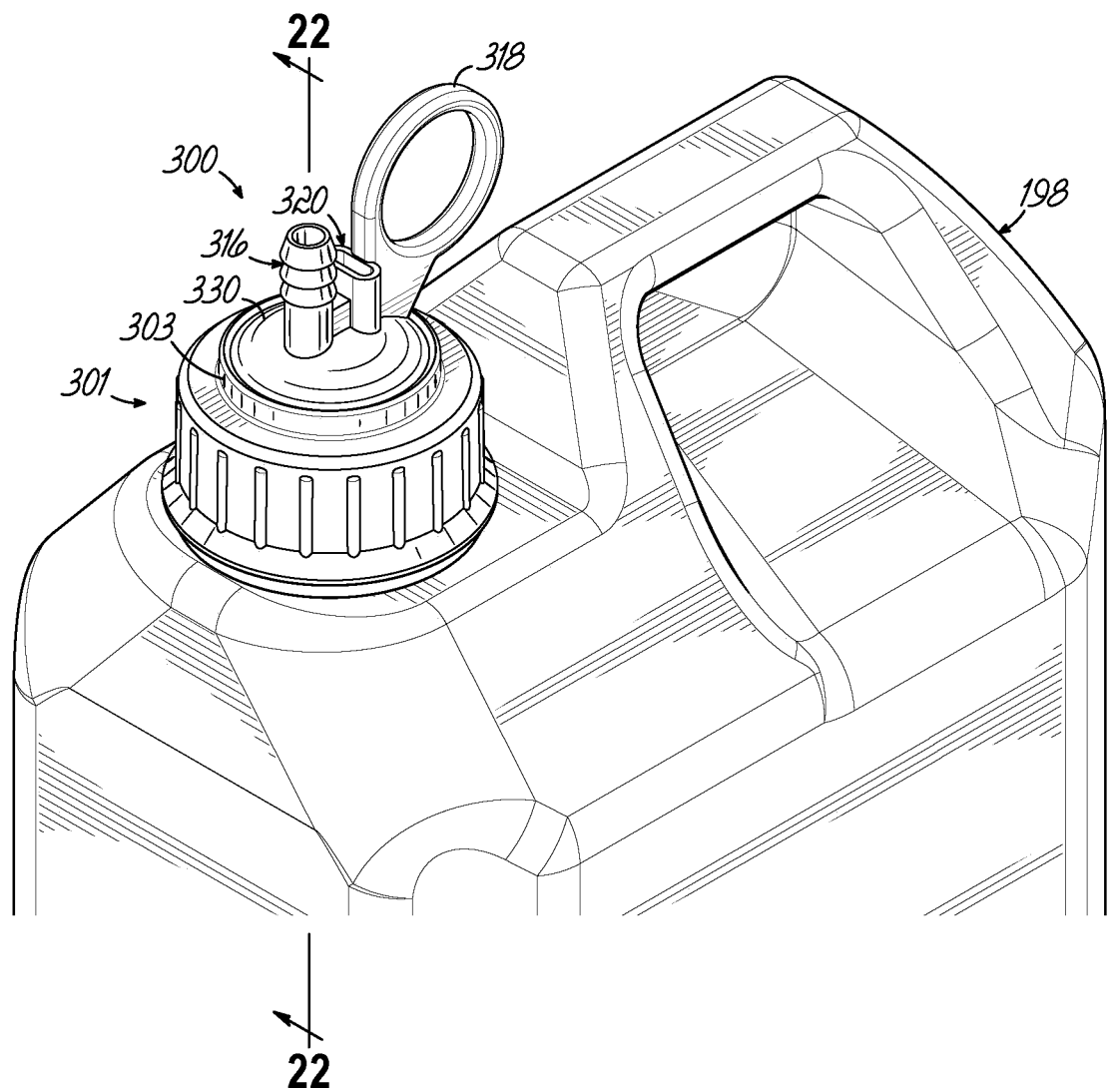
FIG. 21 is a perspective view of the adapter of FIG. 20 with the adapter in an assembled condition.
Figure 22:
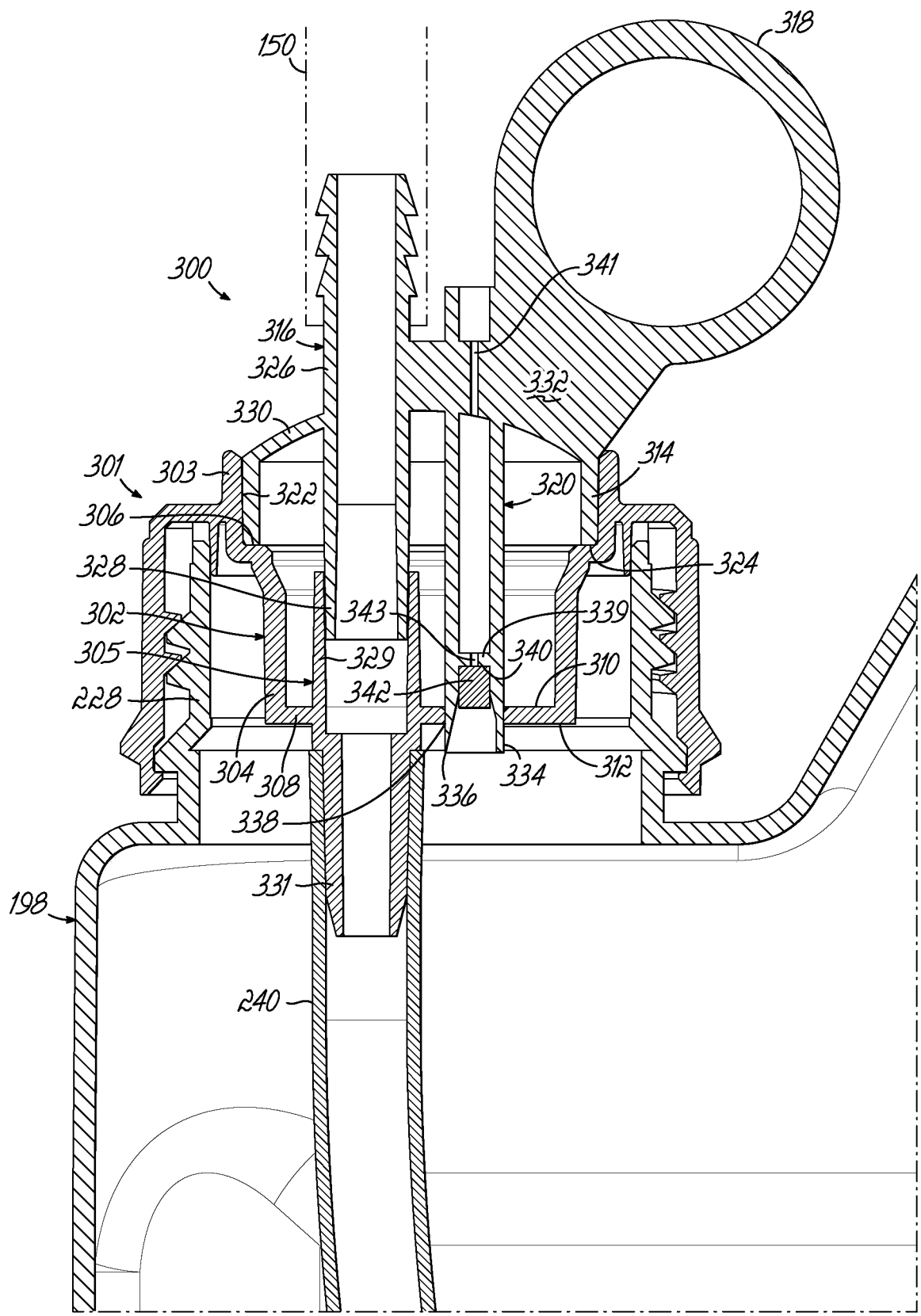
FIG. 22 is a cross-sectional view depicting the adapter of FIG. 21.

FIGS. 20-22 depict an adapter 300 in accordance with an embodiment of the invention. The adapter 300 may be used to provide level sensing features with a connector assembly 301 that lacks a level sensor, for example. The connector assembly 301 includes a lid 302 having an upper portion 303 and a lower portion 304, and a fluidic coupler 305. The upper portion 303 of lid 302 has a diameter larger than the diameter of the lower portion 304 of lid 302 so that a shoulder 306 is formed therebetween. The fluidic coupler 305 of connector assembly 301 may be held in a position that is offset from a central axis of the lid 302 by a partition 308 which caps the lower portion 304 of lid 302. The partition 308 of connector assembly 301 includes an upper surface 310 that faces away from an interior of the container 198, and a lower surface 312 that faces toward the interior of the container 198.

The adapter 300 includes a cylindrical wall 314, a fluidic coupler 316, a grip 318, and a punch 320. The cylindrical wall 314 may be configured to provide a friction fit with an inner surface 322 of the upper portion 303 of lid 302. The cylindrical wall 314 may have a height such that a bottom edge 324 of the cylindrical wall 314 contacts the shoulder 306 of lid 302 when the adapter 300 is fully inserted into the connector assembly 301.

The fluidic coupler 316 includes an upper portion 326 and a lower portion 328, and is held in place by a partition 330 that caps the top of cylindrical wall 314. The upper portion 326 of fluidic coupler 316 may be configured to receive the product supply line 150 or a fitting that is coupled to the product supply line 150. The lower portion 328 of fluidic coupler 316 is configured to engage an upper portion 329 of the fluidic coupler 305 when the adapter 300 is inserted into the connector assembly 301. A lower portion 331 of fluidic coupler 305 is configured to receive the pickup tube 240. The adapter 300 is thereby configured to fluidically couple the product supply line 150 to the pickup tube 240.

The grip 318 comprises a pull ring or other gripping device that facilitates removal of the adapter 300 from the connector assembly 301. The grip 318 may be operatively coupled to the adapter 300 by a flange 332 that reinforces the partition 330. To this end, the flange 332 connects portions of the fluidic coupler 316, grip 318, and punch 320 that protrude from the upper surface of partition 330, thereby increasing the resistance to bending or tearing in this region of the partition 330.

The punch 320 includes an elongated body that passes through the partition 330 of adapter 300 in a region generally between the fluidic coupler 316 and grip 318. A distal end 334 of punch 320 projects outward from the lower surface 312 of partition 330, and includes a cutting edge 336. The punch 320 extends a distance from the lower surface 312 of partition 330 sufficient to cause the cutting edge 336 to create a hole 338 in the partition 308 of connector assembly 301 when the adapter 300 is fully inserted therein. A partition 339 proximate to the distal end 334 of punch 320 defines a cavity 340 configured to hold a level sensor 342.

The cutting edge 336 may encircle the cavity 340 and be sized and shaped so that the hole 338 provides an opening in the partition 308 of connector assembly 301 through which the level sensor 342 can transmit the output signal 38 and receive the reflected signal 42. The cutting edge 336 may include a portion configured so as to not penetrate the partition 308 of connector assembly 301, e.g., a dull or flat portion. This feature of the cutting edge 336 may cause the cut out portion of the partition 308 to remain attached to the connector assembly 301, thereby preventing the cutout portion from falling into the container 198 and potentially plugging the pickup tube 240. The flange 332 and partition 339 may include passages 341, 343 that provide a path for routing a cable or other conductive elements (not shown) for operatively coupling the level sensor 342 to power or processing circuitry. The cable may be sealed within the channels 341, 343 to prevent moisture or other substances from entering.

Figure 23:
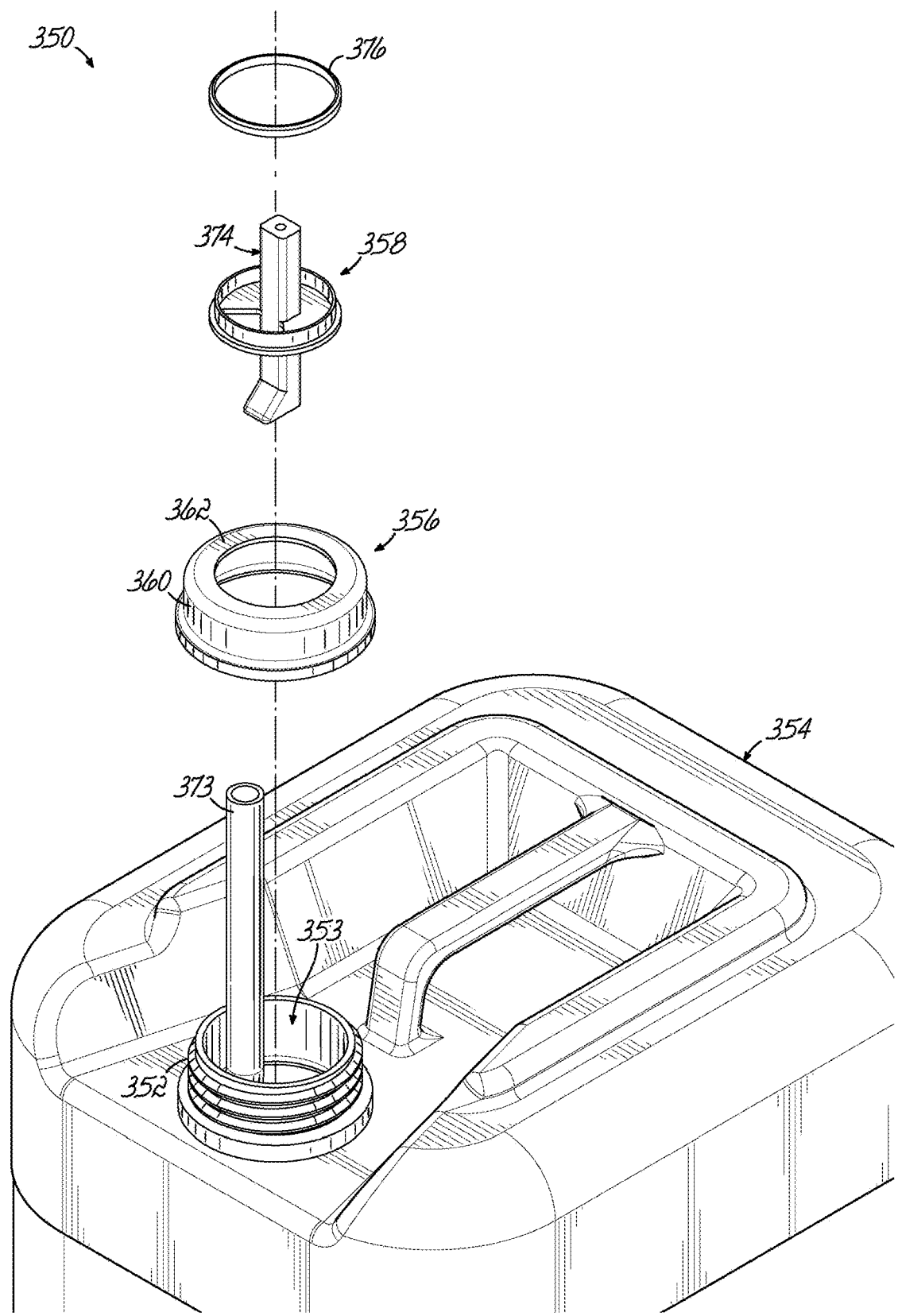
FIG. 23 is an exploded perspective view of a connector assembly in accordance with another embodiment of the invention.
Figure 24:
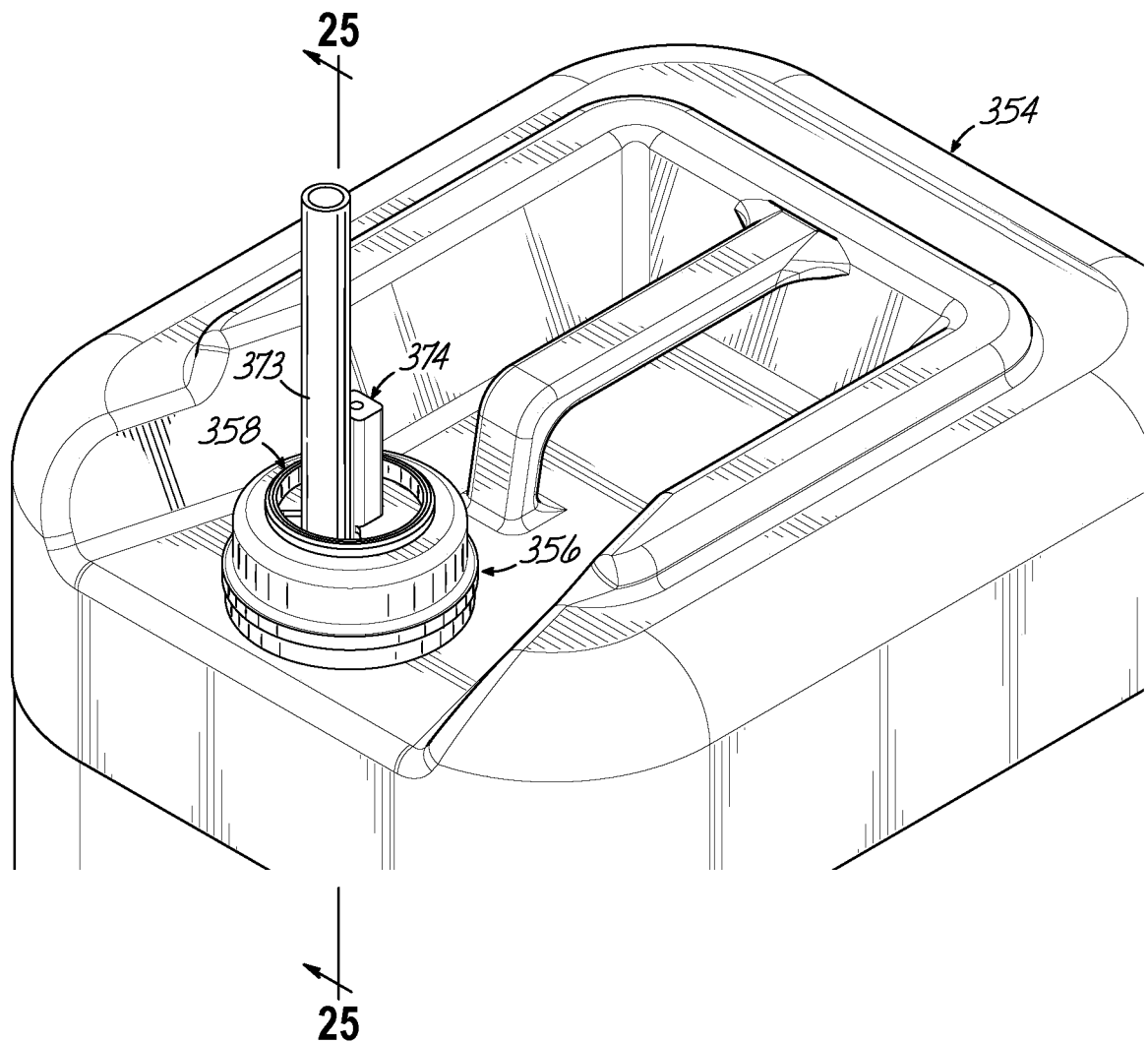
FIG. 24 is a perspective view of the connector assembly of FIG. 23 in an assembled condition.
Figure 25:
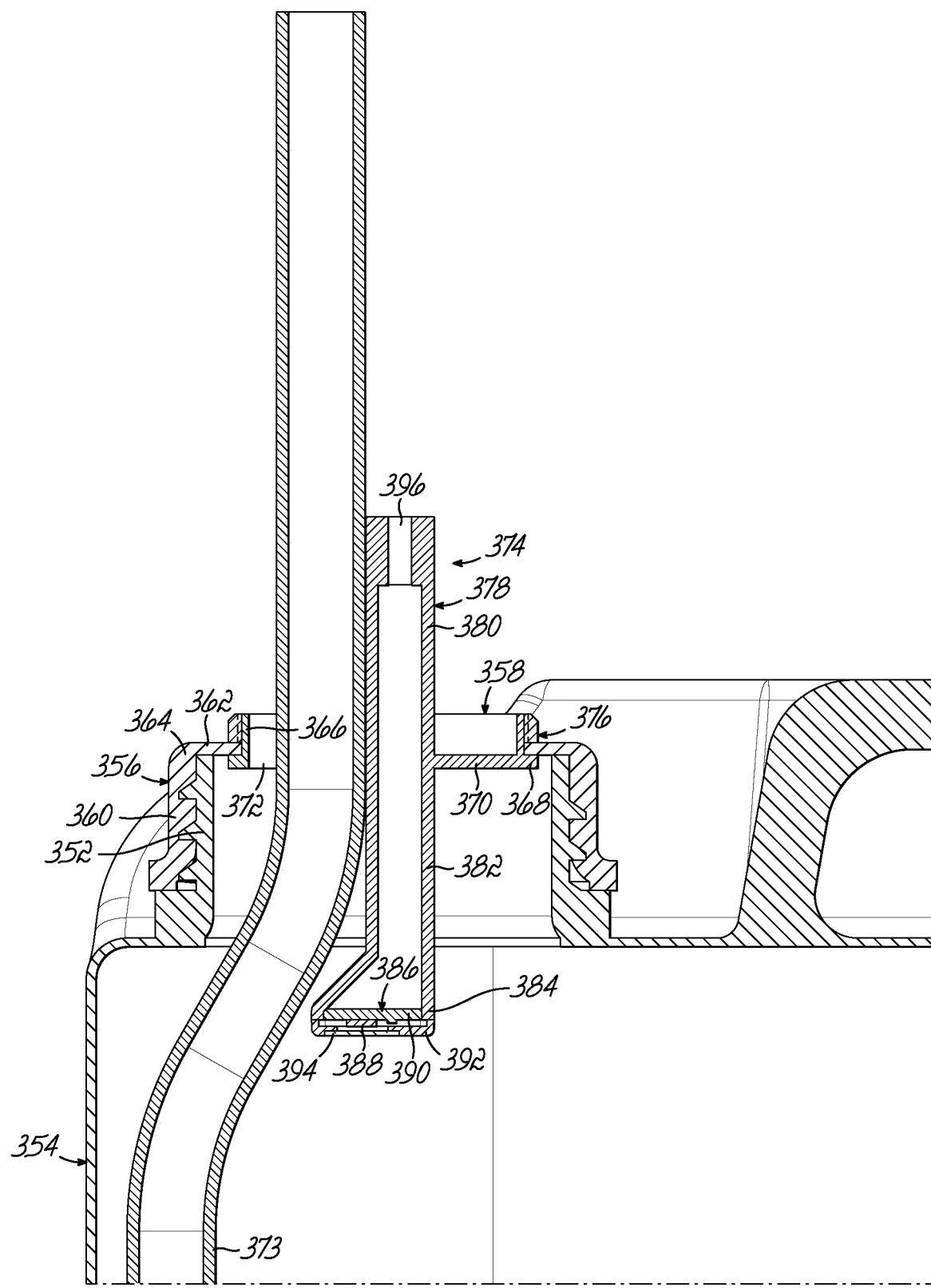
FIG. 25 is a cross-sectional view of the connector assembly of FIGS. 23 and 24.

FIGS. 23-25 depict a connector assembly 350 in accordance with an embodiment of the invention. The connector assembly 350 is configured to engage a neck finish 352 that is disposed about an opening 353 of a container 354, such as a five gallon (20 liter) container commonly used for chemical products. The connector assembly 350 includes a collar 356 and a lid 358. The collar 356 includes a cylindrical wall 360 and a lip 362 comprising an annulus that projects inward from a top edge 364 of the cylindrical wall 360. The lid 358 include a cylindrical wall 366, a lip 368 comprising an annulus that projects outward from a lower edge of the cylindrical wall 366, and a partition 370 generally co-planer with the lip 368. The partition 370 includes an opening 372 through which the product supply line 150 or a pickup tube 373 can be inserted into the container 354, and a sensor assembly 374.

The lid 358 is operatively coupled to the collar 356 by a retaining ring 376 that works in cooperation with the lip 368 of lid 358 to clamp or otherwise hold the lip 362 of collar 356. The retaining ring 376 may be held in place by a friction fit with the cylindrical wall 366 of lid 358, or any other suitable fit, such as a snap fit into a groove (not shown). The retaining ring 376 may be configured to hold the lip 362 of collar 356 against the lip 368 of lid 358 with a level of force that resists rotation of the lid 358, or that allows the lid 358 to rotate with respect to the collar 356.

The sensor assembly 374 includes an elongated body 378 having an upper portion 380 that projects upward from the partition 370 and a lower portion 382 that projects downward from the partition 370. The lower portion 382 of elongated body 378 includes a distal end 384 configured to accept a level sensor 386. The level sensor 386 may include a microchip 388 or other device that is mounted to a circuit board 390 which is held in place by a retainer 392. The retainer 392 attaches to the distal end 384 of lower portion 382 of elongated body 378, and includes a transparent cover 394 through which the output signal 38 and reflected signal 42 can pass. The upper portion 380 of elongated body 378 may include a passage 396 configured to receive a cable (not shown) that operatively couples the level sensor 386 to an external device, e.g., a source of power or a computing device. In an alternative embodiment of the invention, the level sensor 386 may include an internal source of power and communicate with external devices wirelessly, in which case the cable may be omitted.

Figure 26:
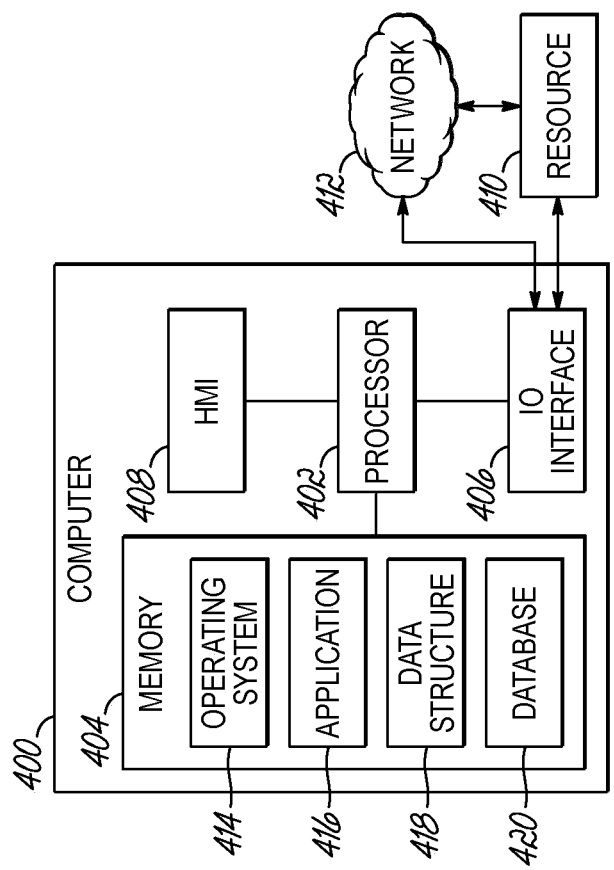
FIG. 26 is a diagrammatic view of a computer that may be used to implement one or more of the components or processes shown in FIGS. 1-24.

Referring now to FIG. 26, embodiments of the invention described above, or portions thereof (e.g., the level sensors, communication modules, mobile devices, dispenser controllers, servers, central databases, etc.) may be implemented using one or more computing devices or systems, such as exemplary computer 400. The computer 400 may include a processor 402, a memory 404, an input/output (I/O) interface 406, and a Human Machine Interface (HMI) 408. The computer 400 may also be operatively coupled to one or more external resources 410 via a network 412 or I/O interface 406. External resources may include, but are not limited to, additional computers, servers, databases, mass storage devices, peripheral devices, cloud-based network services, or any other resource that may be used by the computer 400.

The processor 402 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 404. Memory 404 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 402 may operate under the control of an operating system 414 that resides in memory 404. The operating system 414 may manage computer resources so that computer program code embodied as one or more computer software applications, such as an application 416 residing in memory 404, may have instructions executed by the processor 402. In an alternative embodiment, the processor 402 may execute the application 416 directly, in which case the operating system 414 may be omitted. One or more data structures 418 may also reside in memory 404, and may be used by the processor 402, operating system 414, or application 416 to store or manipulate data.

The I/O interface 406 may provide a machine interface that operatively couples the processor 402 to other devices and systems, such as the external resource 410 or the network 412. The application 416 may thereby work cooperatively with the external resource 410 or network 412 by communicating via the I/O interface 406 to provide the various features, functions, applications, processes, or modules comprising embodiments of the invention. The application 416 may also have program code that is executed by one or more external resources 410, or otherwise rely on functions or signals provided by other system or network components external to the computer 400. Indeed, given the nearly endless hardware and software configurations possible, persons having ordinary skill in the art will understand that embodiments of the invention may include applications that are located externally to the computer 400, distributed among multiple computers or other external resources 410, or provided by computing resources (hardware and software) that are provided as a service over the network 412, such as a cloud computing service.

The HMI 408 may be operatively coupled to the processor 402 of computer 400 to allow a user to interact directly with the computer 400. The HMI 408 may include video or alphanumeric displays, a touch screen, a speaker, and any other suitable audio and visual indicators capable of providing data to the user. The HMI 408 may also include input devices and controls such as an alphanumeric keyboard, a pointing device, keypads, pushbuttons, control knobs, microphones, etc., capable of accepting commands or input from the user and transmitting the entered input to the processor 402.

A database 420 may reside in memory 404, and may be used to collect and organize data used by the various systems and modules described herein. The database 420 may include data and supporting data structures that store and organize the data. In particular, the database 420 may be arranged with any database organization or structure including, but not limited to, a relational database, a hierarchical database, a network database, or combinations thereof. A database management system in the form of a computer software application executing as instructions on the processor 402 may be used to access the information or data stored in records of the database 420 in response to a query, which may be dynamically determined and executed by the operating system 414, other applications 416, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flow-charts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the flow-charts, sequence diagrams, or block diagrams.

In certain alternative embodiments, the functions, acts, or operations specified in the flow-charts, sequence diagrams, or block diagrams may be re-ordered, processed serially, or processed concurrently consistent with embodiments of the invention. Moreover, any of the flow-charts, sequence diagrams, or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A liquid level monitoring device comprising:
   an elongated body comprising: a transceiver mounted thereto, and a cutting edge at a distal end of the elongated body, the cutting edge configured to puncture a container to, thereby, position the transceiver within an interior of the container, wherein the transceiver is configured to, with the elongated body inserted into the container, transmit an output signal into the container and receive a portion of the output signal reflected back to the transceiver as a reflected signal; and
   a processing system in communication with the transceiver and configured to perform operations comprising:
   determining, at a first time, an amount of a product in the container by comparing a characteristic of the reflected signal to the characteristic of the output signal.

2. The device of claim 1, wherein the amount is a first amount and wherein the operations further comprise:
   determining a second amount of the product in the container at a second time that is after the first time;
   determining an expected amount of the product in the container based on the first amount of the product and a number and duration of dispense cycles that occurred between the first time and the second time; and
   setting an unexpected product level alarm condition if the second amount of the product is different than the expected amount of the product by more than a threshold amount.

3. The device of claim 1, wherein determining the amount of the product in the container comprises:
   determining an amount of time between a transmission of the output signal and an arrival time of the reflected signal;
   determining the amount of the product in the container based on the amount of time.

4. The device of claim 3, wherein the operations further comprise:
   determining a distance between a surface of the product and the transceiver based on the amount of time; and
   determining the amount of the product in the container based on the distance.

5. The device of claim 1, wherein the operations further comprise determining a size of the container based on the characteristic of the reflected signal.

6. The device of claim 5, wherein the operations comprise comparing the characteristic of the reflected signal to one or more of the characteristic of the output signal or a characteristic of a reflected signal associated with one or more containers in a library of containers.

7. The device of claim 1, wherein the operations further comprise transmitting data indicative of the amount of the product in the container to a database.

8. The device of claim 7, wherein the operations further comprise transmitting the data indicative of the amount of the product in response to receiving an interrogation signal from a mobile device.

9. The device of claim 8, wherein the database is a network database, and the data is transmitted to the database through the mobile device.

10. The device of claim 1, wherein the operations comprise issuing an alarm in response to identifying a change in a level of the product that exceeds a threshold.

11. The device of claim 1, wherein the cutting edge encircles a cavity within the elongated body, and wherein the transceiver is mounted within the cavity.

12. The device of claim 1, further comprising a transparent sleeve coupled to the elongated body and positioned in front of an output of the transceiver.

13. The device of claim 1, further comprising a connector assembly coupled to the elongated body, the connector assembly comprising a product supply line configured to extend into the container.

14. The device of claim 13, wherein the connector assembly comprises a pump, and the product supply line is coupled to an inlet of the pump.

15. A method of operating a liquid level monitoring device, the method including operations comprising:
    controlling a transceiver that is mounted to a structure attached to a container to transmit an output signal into the container and receive a portion of the output signal reflected back to the transceiver as a reflected signal;
    determining a first level of a product in a container at a first time by comparing a characteristic of a reflected signal to a characteristic of the output signal;
    determining a second level of the product in the container at a second time that is a period of time after the first time;
    determining an expected level of the product in the container based on the first level of the product and a number and duration of dispense cycles that occurred between the first time and the second time; and
    setting an unexpected product level alarm condition if the second level of the product is greater than or less than the expected level of the product by more than a threshold amount.

16. The method of claim 15, wherein the operations further comprise determining a size of the container based on the characteristic of the reflected signal.

17. The method of claim 16, wherein the operations comprise comparing the characteristic of the reflected signal to one or more of the characteristic of the output signal or a characteristic of a reflected signal associated with one or more containers in a library of containers.

18. A liquid level monitoring device comprising at least one processing system configured to perform the operations of claim 15.

19. The device of claim 18, wherein the transceiver is mounted to a lid configured to engage with an opening of the container.

20. The device of claim 18, wherein the transceiver is mounted to an elongated body comprising a cutting edge at a distal end, the cutting edge configured to cut a hole in the container to provide access to an interior of the container.

* * * * *